United States Patent
Sakurabu

(10) Patent No.: US 10,520,793 B2
(45) Date of Patent: Dec. 31, 2019

(54) FOCUSING CONTROL DEVICE, FOCUSING CONTROL METHOD, FOCUSING CONTROL PROGRAM, LENS DEVICE, AND IMAGING DEVICE

(71) Applicant: FUJIFILM Corporation, Tokyo (JP)

(72) Inventor: Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/933,636

(22) Filed: Mar. 23, 2018

(65) Prior Publication Data

US 2018/0210318 A1   Jul. 26, 2018

Related U.S. Application Data

(63) Continuation of application No. PCT/JP2016/077508, filed on Sep. 16, 2016.

(30) Foreign Application Priority Data

Sep. 30, 2015 (JP) ................. 2015-194235

(51) Int. Cl.
G03B 13/36 (2006.01)
H04N 5/232 (2006.01)
(Continued)

(52) U.S. Cl.
CPC ............... *G03B 13/36* (2013.01); *G02B 7/34* (2013.01); *H04N 5/23212* (2013.01); *G02B 7/28* (2013.01)

(58) Field of Classification Search
CPC ...... G03B 13/36; H04N 5/23212; G02B 7/34; G02B 7/28
See application file for complete search history.

(56) References Cited

U.S. PATENT DOCUMENTS 6,175,692 B1   1/2001 Onoda et al.
2008/0193116 A1   8/2008 Uenishi
(Continued)

FOREIGN PATENT DOCUMENTS

JP   7-120668 A   5/1995
JP   8-15604 A   1/1996
(Continued)

OTHER PUBLICATIONS

International Preliminary Report on Patentability and English translation of the Written Opinion of the International Searching Authority (Forms PCT/IB/326, PCT/IB/373 and PCT/ISA/237) for Application No. PCT/JP2016/077508, dated Apr. 12, 2018.
(Continued)

*Primary Examiner* — Ahmed A Berhan
(74) *Attorney, Agent, or Firm* — Birch, Stewart, Kolasch & Birch, LLP

(57) ABSTRACT

A focusing control device includes: a sensor as defined herein; a first correlation value generation unit as defined herein; a second correlation value generation unit as defined herein; a first phase difference amount measurement unit as defined herein; a second phase difference amount measurement unit as defined herein; a target position determination unit that selectively performs a first process of determining a target position of the focus lens based on the first phase difference amount and a second process of determining the target position of the focus lens based on the second phase difference amount, based on the correlation values acquired by the first correlation value generation unit and the correlation values acquired by the second correlation value generation unit; and a lens driving control unit that drives the focus lens to the target position determined through the first process or the second process.

25 Claims, 27 Drawing Sheets

(51) Int. Cl.
*G02B 7/34* (2006.01)
*G02B 7/28* (2006.01)

(56) References Cited

U.S. PATENT DOCUMENTS

| | | | |
|---|---|---|---|
| 2011/0019028 A1* | 1/2011 | Kimijima | G02B 7/34 |
| | | | 348/222.1 |
| 2011/0134310 A1* | 6/2011 | Kimura | G02B 7/28 |
| | | | 348/345 |
| 2016/0156836 A1 | 6/2016 | Aoki | |

FOREIGN PATENT DOCUMENTS

| | | |
|---|---|---|
| JP | 11-337814 A | 12/1999 |
| JP | 2008-197286 A | 8/2008 |
| JP | 2008-298943 A | 12/2008 |
| JP | 2013-218082 A | 10/2013 |
| WO | WO 2015/025590 A1 | 2/2015 |

OTHER PUBLICATIONS

International Search Report and English translation (Form PCT/ISA/210) for Application No. PCT/JP2016/077508, dated Dec. 13, 2016.

* cited by examiner

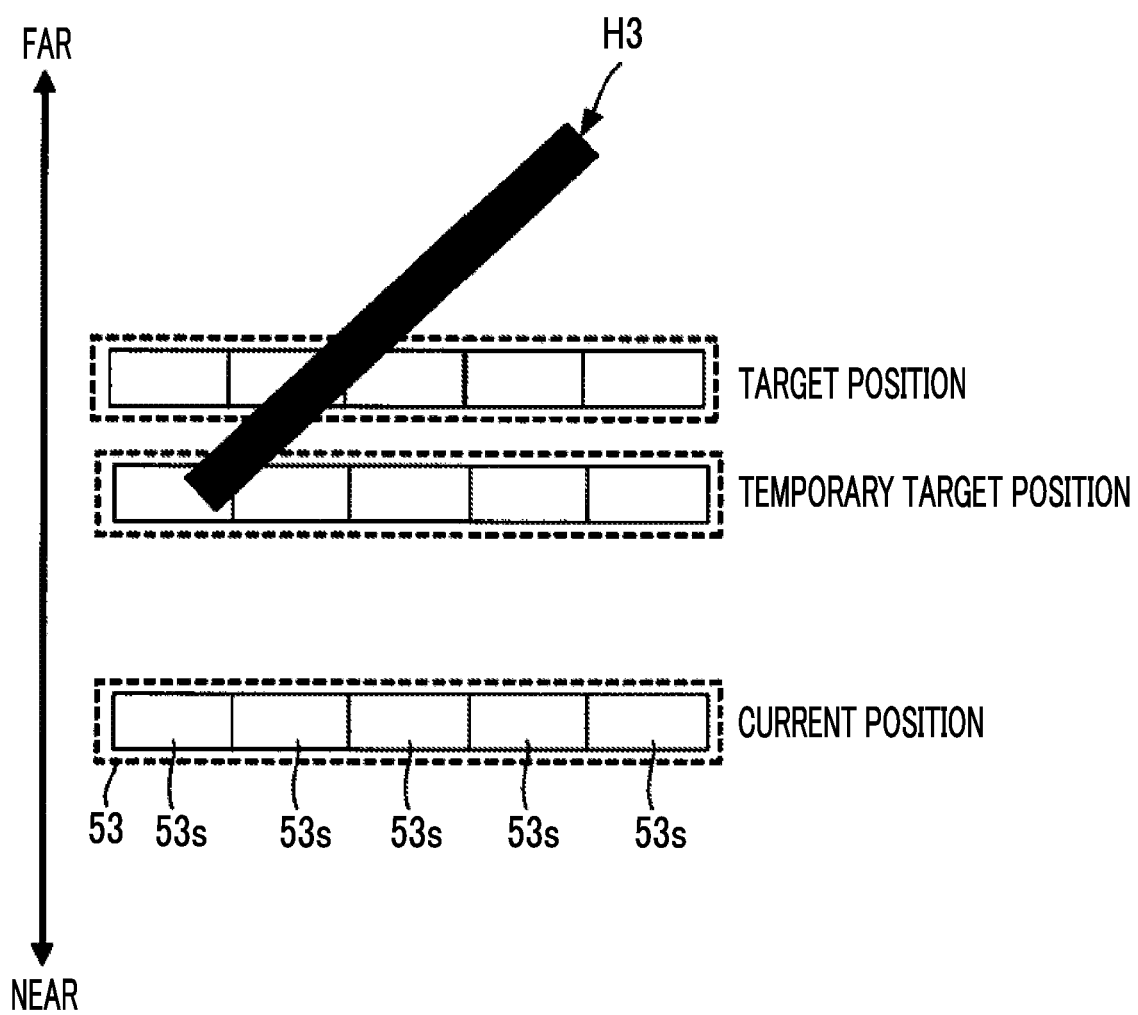

FOCUSING CONTROL DEVICE, FOCUSING CONTROL METHOD, FOCUSING CONTROL PROGRAM, LENS DEVICE, AND IMAGING DEVICE

CROSS REFERENCE TO RELATED APPLICATION

This is a continuation of International Application No. PCT/JP2016/077508 filed on Sep. 16, 2016, and claims priority from Japanese Patent Application No. 2015-194235 filed on Sep. 30, 2015, the entire disclosures of which are incorporated herein by reference.

BACKGROUND OF THE INVENTION

1. Field of the Invention

The present invention relates to a focusing control device, a focusing control method, a computer readable medium storing a focusing control program, a lens device, and an imaging device.

2. Description of the Related Art

In recent years, with an increase in resolution of imaging elements, such as a charge coupled device (CCD) image sensor and a complementary metal oxide semiconductor (CMOS) image sensor, there is a rapid increase in demand for information devices having an imaging function, such as a digital still camera, a digital video camera, and a mobile phone such as a smartphone. The information devices having an imaging function described above are referred to as imaging devices.

In these imaging devices, as a focusing control method which focuses on a main subject, a contrast auto focus (AF) method or a phase difference AF method is employed. Since high-speed processing is able to be performed, the phase difference AF method is a method that is particularly effective in a case where a moving image is captured by continuously imaging a subject by the imaging element.

JP2008-298943A and JP1999-337814A (JP-H11-337814A) disclose an imaging device that performs focusing control through the phase difference AF method by using a plurality of focus detection areas set on a light reception surface of the imaging element.

The imaging device of JP2008-298943A calculates a defocus amount of an imaging optical system for each of the plurality of focus detection areas, and determines the focus detection area in which the calculated defocus amount is minimum, as an optimal area for performing focus adjustment.

The imaging device of JP1999-337814A performs the focus adjustment of the imaging optical system based on the defocus amount calculated in each of all the focus detection areas in a case where the subject does not include a moving object, and performs the focusing control of the imaging optical system based on the defocus amount calculated in each of the focus detection areas near the moving object in a case where the subject includes the moving object.

JP2008-197286A discloses an imaging device that dynamically sets the focus detection area as a target for calculating an AF evaluation value through the contrast AF method depending on a detection result of a main subject.

SUMMARY OF THE INVENTION

In the phase difference AF method, outputs of a pair of sensor rows for phase difference detection present in the focus detection area set on the light reception surface of the imaging element are input as data items, and the correlation between the outputs of the pair of sensors is acquired.

Specifically, the data items of one sensor row is $A[1], \ldots,$ and $A[k]$, the data items of the other sensor row are $B[1], \ldots,$ and $B[k]$. A value of "d" in a case where an area $S[d]$ surrounded by two data waveforms obtained by the following expression in a case where the two data items are shifted in one direction as a target of the phase difference detection by a shift amount of "d" is minimum is calculated as a phase difference amount, and the focus lens is driven based on the phase difference amount.

[Expression 1]

$$S[d] = \sum_{n=1}^{k} (A[n+d] - B[n])^2 \quad d = -L, \ldots, -2, -1, 0, 1, 2, \ldots, L \tag{1}$$

A subject image formed in the focus detection area includes a background image in addition to a main subject such as a person. Thus, in a case where the focus detection area is large, the background of the main subject may be in focus or a position between the main subject and the background may be in focus from the result of the correlation calculation.

In a case where the focus detection area is sufficiently smaller than the main subject, it is possible to accurately focus on the main subject. However, in a case where the main subject moves, it is difficult to continue to hold only the main subject in the focus detection area.

In a case where the focus detection area is small, since a feature point is not present in the subject image in the focus detection area in a case where the subject image formed in the focus detection area is greatly blurred, the phase difference amount is not able to be accurately determined.

In a case where the focus detection area is small, a length of the pair of sensor rows is short, and a range of the shift amount d is narrow (a value of L is small). Thus, determination accuracy of the phase difference amount is easily influenced by noise.

In a case where the focus detection area is small, the area $S[d]$ in Expression (1) repeatedly increases and decreases in a case where periodic patterns such as a subject having streak patterns are captured, and thus, it is difficult to accurately determine the phase difference amount.

As stated above, although the phase difference AF method has advantages in both a case where the focus detection area is large and a case where the focus detection area is small, it is possible to acquire high focusing accuracy in a case where it is possible to achieve these advantages.

The invention has been made in view of such circumstances, and an object of the invention is to provide a focusing control device, a focusing control method, a computer readable medium storing a focusing control program, a lens device, and an imaging device capable of improving focusing accuracy through a phase difference AF method.

A focusing control device according to the invention comprises a sensor that has a focus detection area in which a plurality of first signal detection sections which receives one of a pair of luminous fluxes passing through different portions arranged in one direction of a pupil region of an imaging optical system including a focus lens and detects signals corresponding to light reception amounts and a plurality of second signal detection sections which receives the other one of the pair of luminous fluxes and detects signals corresponding to light reception amounts are formed, a first correlation value generation unit that acquires correlation values between a first signal group output from the plurality of first signal detection sections of the focus detection area and a second signal group output from the plurality of second signal detection sections of the focus detection area, a second correlation value generation unit that performs a process of acquiring correlation values between a third signal group output from the plurality of first signal detection sections included in each of divided areas in a state in which the focus detection area is divided in the one direction and a fourth signal group output from the plurality of second signal detection sections included in the divided area, for each divided area, a first phase difference amount measurement unit that measures a first phase difference amount between the first signal group and the second signal group from the correlation values acquired by the first correlation value generation unit, a second phase difference amount measurement unit that measures a second phase difference amount between the third signal group and the fourth signal group for each divided area from the correlation values acquired by the second correlation value generation unit, a target position determination unit that selectively performs a first process of determining a target position of the focus lens based on the first phase difference amount and a second process of determining the target position of the focus lens based on the second phase difference amount, based on the correlation values acquired by the first correlation value generation unit and the correlation values acquired by the second correlation value generation unit, and a lens driving control unit that drives the focus lens to the target position determined through the first process or the second process.

A focusing control method according to the invention comprises a first correlation value generation step of acquiring correlation values between a first signal group output from a plurality of first signal detection sections of a focus detection area of a sensor and a second signal group output from a plurality of second signal detection sections of the focus detection area, the plurality of first signal detection sections which receives one of a pair of luminous fluxes passing through different portions arranged in one direction of a pupil region of an imaging optical system including a focus lens and detects signals corresponding to light reception amounts and the plurality of second signal detection sections which receives the other one of the pair of luminous fluxes and detects signals corresponding to light reception amounts being formed in the focus detection area, a second correlation value generation step of performing a process of acquiring correlation values between a third signal group output from the plurality of first signal detection sections included in each of divided areas in a state in which the focus detection area is divided in the one direction and a fourth signal group output from the plurality of second signal detection sections included in the divided area, for each divided area, a first phase difference amount measurement step of measuring a first phase difference amount between the first signal group and the second signal group from the correlation values acquired in the first correlation value generation step, a second phase difference amount measurement step of measuring a second phase difference amount between the third signal group and the fourth signal group for each divided area from the correlation values acquired in the second correlation value generation step, a target position determination step of selectively performing a first process of determining a target position of the focus lens based on the first phase difference amount and a second process of determining the target position of the focus lens based on the second phase difference amount, based on the correlation values acquired in the first correlation value generation step and the correlation values acquired in the second correlation value generation step, and a lens driving control step of driving the focus lens to the target position determined through the first process or the second process.

A focusing control program according to the invention causes a computer to perform a first correlation value generation step of acquiring correlation values between a first signal group output from a plurality of first signal detection sections of a focus detection area of a sensor and a second signal group output from a plurality of second signal detection sections of the focus detection area, the plurality of first signal detection sections which receives one of a pair of luminous fluxes passing through different portions arranged in one direction of a pupil region of an imaging optical system including a focus lens and detects signals corresponding to light reception amounts and the plurality of second signal detection sections which receives the other one of the pair of luminous fluxes and detects signals corresponding to light reception amounts being formed in the focus detection area, a second correlation value generation step of performing a process of acquiring correlation values between a third signal group output from the plurality of first signal detection sections included in each of divided areas in a state in which the focus detection area is divided in the one direction and a fourth signal group output from the plurality of second signal detection sections included in the divided area, for each divided area, a first phase difference amount measurement step of measuring a first phase difference amount between the first signal group and the second signal group from the correlation values acquired in the first correlation value generation step, a second phase difference amount measurement step of measuring a second phase difference amount between the third signal group and the fourth signal group for each divided area from the correlation values acquired in the second correlation value generation step, a target position determination step of selectively performing a first process of determining a target position of the focus lens based on the first phase difference amount and a second process of determining the target position of the focus lens based on the second phase difference amount, based on the correlation values acquired in the first correlation value generation step and the correlation values acquired in the second correlation value generation step, and a lens driving control step of driving the focus lens to the target position determined through the first process or the second process.

A lens device according to the invention comprises the focusing control device, and an imaging optical system including a focus lens for causing light to be incident on the sensor.

An imaging device according to the invention comprises the focusing control device.

According to the invention, it is possible to provide a focusing control device, a focusing control method, a focusing control program, a lens device, and an imaging device capable of improving focusing accuracy through a phase difference AF method.

BRIEF DESCRIPTION OF THE DRAWINGS

FIG. 16 is a schematic diagram for describing an effect of the first modification example.

FIG. 19 is a flowchart for describing a target position determination process by means of the system control unit 11a.

DESCRIPTION OF THE PREFERRED EMBODIMENTS

Figure 1:
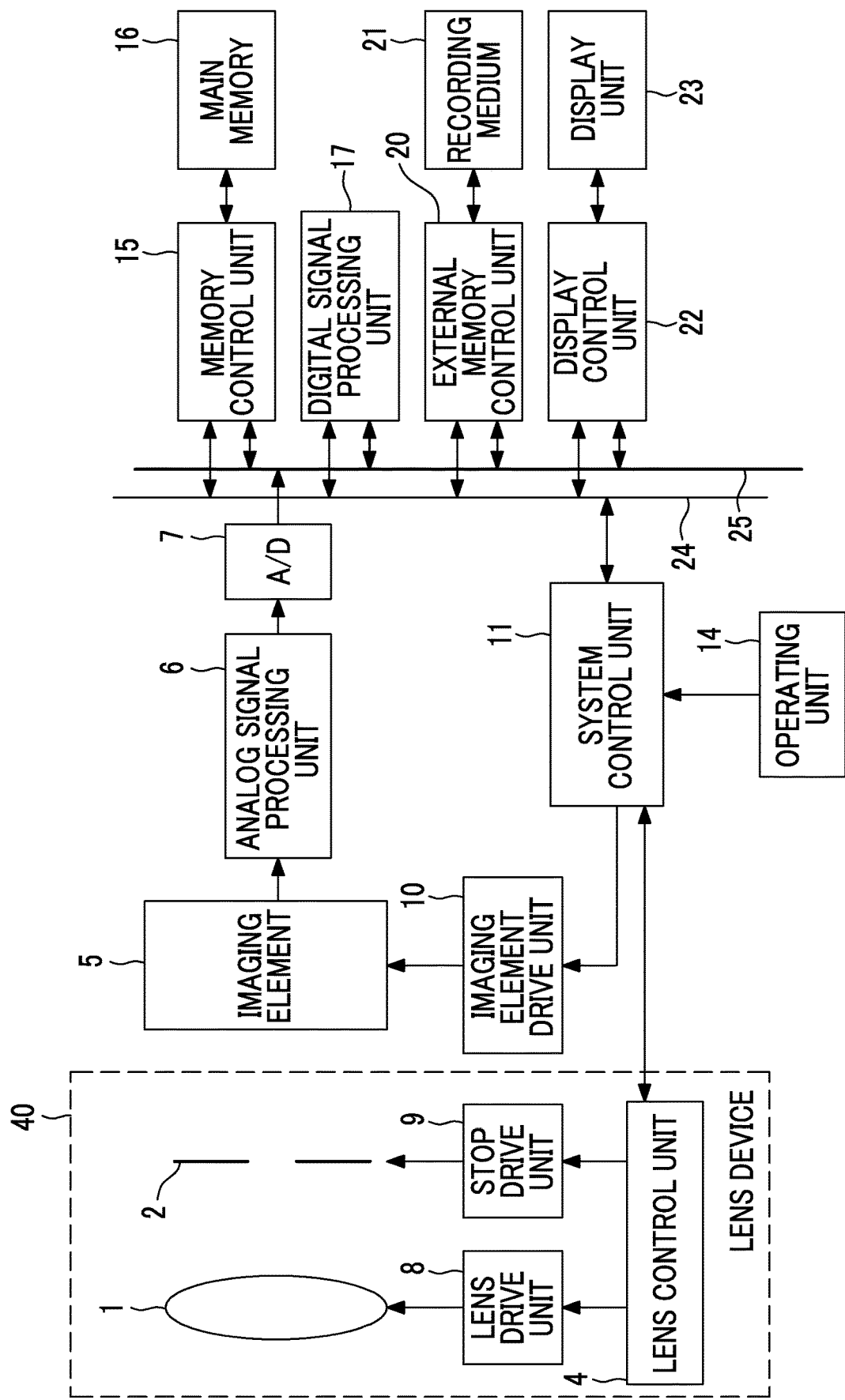
FIG. 1 is a diagram showing the schematic configuration of a digital camera as an example of an imaging device for describing an embodiment of the invention.

Hereinafter, an embodiment of the invention will be described by referring to the drawings.

FIG. 1 is a diagram showing the schematic configuration of a digital camera as an example of an imaging device for describing an embodiment of the invention.

The digital camera shown in FIG. 1 includes a lens device 40 which includes an imaging lens 1, a stop 2, a lens control unit 4, a lens drive unit 8, and a stop drive unit 9. Although it has been described in the present embodiment that the lens device 40 is detachably attached to a digital camera main body, the lens device may be fixed to the digital camera main body.

The imaging lens 1 and the stop 2 constitute an imaging optical system, and the imaging optical system includes at least a focus lens. The focus lens is a lens for adjusting a focus of the imaging optical system, and is composed of a single lens or a plurality of lenses. The focus lens moves in an optical axis direction of the imaging optical system, and thus, the focus adjustment is performed.

The lens control unit 4 of the lens device 40 is able to communicate with a system control unit 11 of the digital camera main body in a wired or wireless manner. The lens control unit 4 drives the focus lens included in the imaging lens 1 through the lens drive unit 8 or drives the stop 2 through the stop drive unit 9 according to a command from the system control unit 11.

The digital camera main body includes an imaging element 5 which images a subject through the imaging optical system, such as a CCD type or a CMOS type, an analog signal processing unit 6 which is connected to an output of the imaging element 5 and performs analog signal processing such as correlative double sampling processing, and an analog-to-digital conversion circuit 7 which converts the analog signal output from the analog signal processing unit 6 into a digital signal. The analog signal processing unit 6 and the analog-to-digital conversion circuit 7 are controlled by the system control unit 11.

The system control unit 11 that generally controls the entire electric control system of the digital camera drives the imaging element 5 through an imaging element drive unit 10, and outputs a subject image captured through the lens device 40, as captured image signals. A command signal from a user is input to the system control unit 11 through an operating unit 14.

The system control unit 11 includes a processor and a memory such as a random access memory (RAM) or a read only memory (ROM). The system control unit 11 realizes functions to be described below by executing a focusing control program stored in a main memory 16 or a built-in ROM.

The electric control system of the digital camera includes the main memory 16, a memory control unit 15 which is connected to the main memory 16, a digital signal processing unit 17 which generates captured image data by performing interpolation calculation, gamma correction calculation, RGB/YC conversion processing, and the like on the captured image signals output from the analog-to-digital conversion circuit 7, an external memory control unit 20 to which a detachable recording medium 21 is connected, and a display control unit 22 to which a display unit 23 mounted on a camera rear surface or the like is connected.

The memory control unit 15, the digital signal processing unit 17, the external memory control unit 20, and the display control unit 22 are connected to one another by a control bus 24 and a data bus 25, and are controlled according to commands from the system control unit 11.

Figure 2:
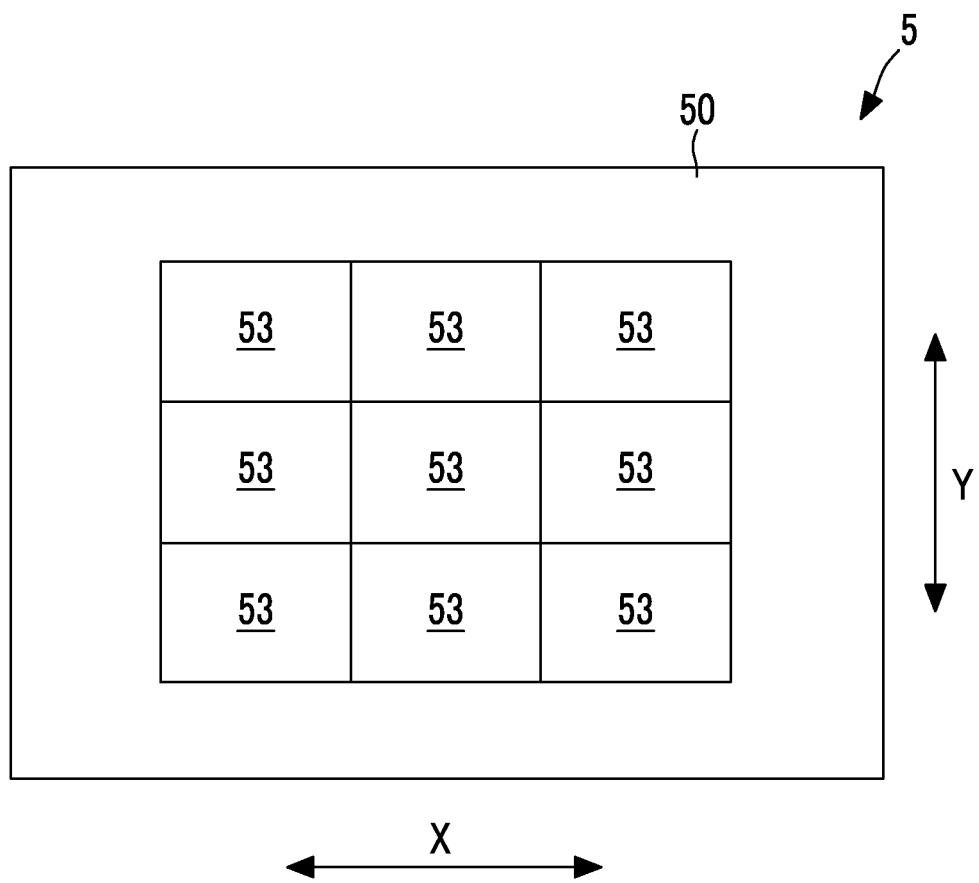
FIG. 2 is a schematic plan view showing the entire configuration of an imaging element 5 mounted on the digital camera shown in FIG. 1.

FIG. 2 is a schematic plan view showing the entire configuration of the imaging element 5 mounted on the digital camera shown in FIG. 1.

The imaging element 5 includes a light reception surface 50 on which a plurality of pixels arranged in a two-dimensional shape in a row direction X which is one direction and a column direction Y perpendicular to the row direction X are arranged. Nine focus detection areas (hereinafter, referred to as AF areas) 53 that are areas as targets to be in focus are formed on the light reception surface 50 in the example of FIG. 2.

The AF area 53 is an area including imaging pixels and phase difference detection pixels, as pixels.

Only the imaging pixels are arranged in portions other than AF areas 53 on the light reception surface 50. The AF areas 53 may be formed on the light reception surface 50 without gaps.

Figure 3:
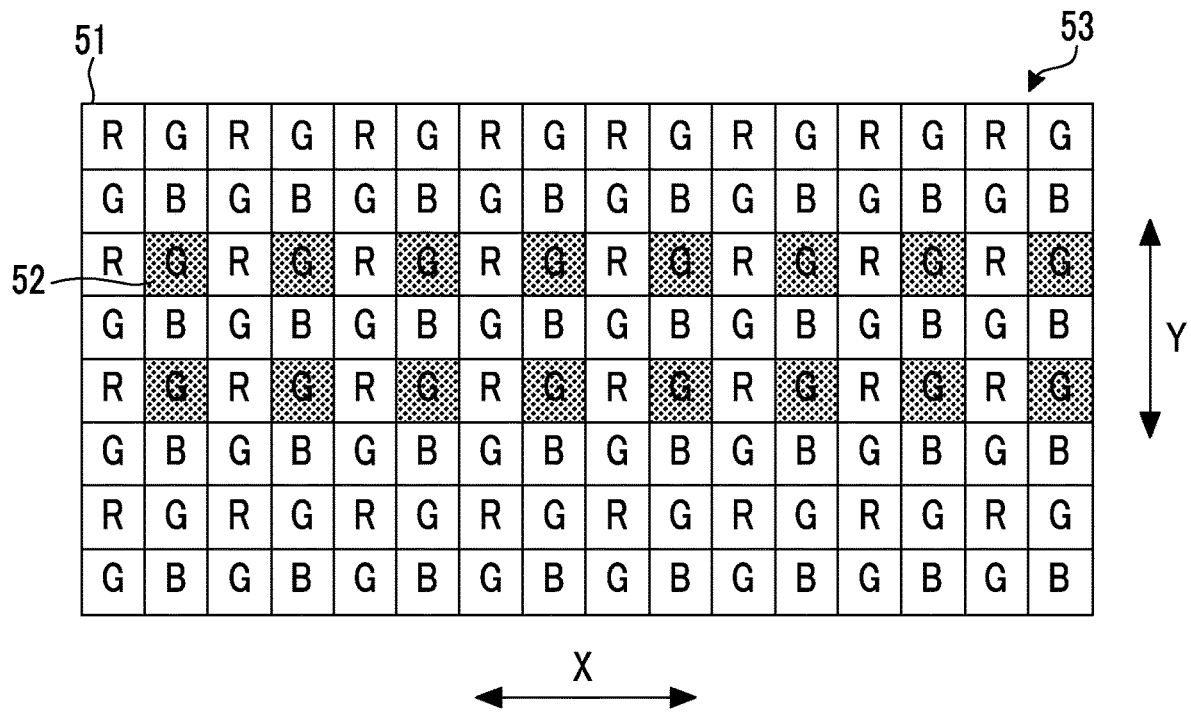
FIG. 3 is a partial enlarged view of one AF area 53 shown in FIG. 2.

FIG. 3 is a partial enlarged view of one AF area 53 shown in FIG. 2.

Pixels 51 are arranged in a two-dimensional shape in the AF area 53. The pixel 51 includes a photoelectric conversion section such as a photodiode and a color filter formed in the photoelectric conversion section.

In FIG. 3, the pixels 51 (referred to as R pixels 51) including the color filters (R filters) that transmit red light are assigned a character of "R", the pixels 51 (referred to as G pixels 51) including the color filters (G filters) that transmit green light are assigned a character of "G", and the pixels 51 (referred to as B pixels 51) including the color filters (B filters) that transmit blue light are assigned a character of "B". The arrangement of the color filters is a Bayer array on the entire light reception surface 50.

In the AF area 53, some (hatched pixels 51 in FIG. 3) of the G pixels 51 are phase difference detection pixels 52. In the example of FIG. 3, the G pixels 51 in an arbitrary pixel row among the pixel rows including the R pixels 51 and the G pixels 51 and G pixels 51 which are closest to the G pixels 51 in the column direction Y and have the same color as that of the G pixels are the phase difference detection pixels 52.

Figure 4:
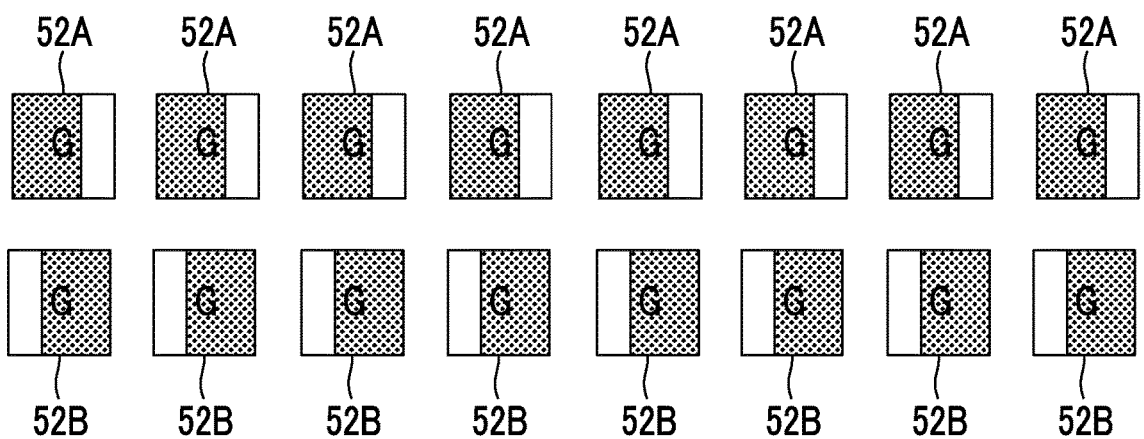
FIG. 4 is a diagram showing only phase difference detection pixels 52 shown in FIG. 3.

FIG. 4 is a diagram showing only the phase difference detection pixels 52 shown in FIG. 3.

As shown in FIG. 4, the phase difference detection pixels 52 includes two kinds of pixels such as phase difference detection pixels 52A and phase difference detection pixels 52B.

The phase difference detection pixel 52A is a first signal detection section which receives one of a pair of luminous fluxes passing through two different portions arranged in the row direction X of a pupil region of the imaging optical system, and detects a signal corresponding to a light reception amount.

The phase difference detection pixel 52B is a second signal detection section which receives the other one of the pair of luminous fluxes, and detects a signal corresponding to a light reception amount.

In the AF area 53, the plurality of pixels 51 other than the phase difference detection pixels 52A and 52B is the imaging pixels, and the imaging pixels receive a pair of luminous fluxes passing through the imaging lens 1, and detect signals corresponding to light reception amounts.

A light shielding film is formed on the photoelectric conversion sections of the pixels 51, and openings that prescribe light reception areas of the photoelectric conversion sections are formed in the light shielding film.

A center of the opening of the imaging pixel 51 matches a center of the photoelectric conversion section of the imaging pixel 51. In contrast, the center of the opening (a white portion of FIG. 4) of the phase difference detection pixel 52A is shifted to the right side from the center of the photoelectric conversion section of the phase difference detection pixel 52A.

The center of the opening (a white portion in FIG. 4) of the phase difference detection pixel 52B is shifted to the left side from the center of the photoelectric conversion section of the phase difference detection pixel 52B. The right side mentioned herein is one side in the row direction X shown in FIG. 3, and the left side is the other side in the row direction X.

Figure 5:
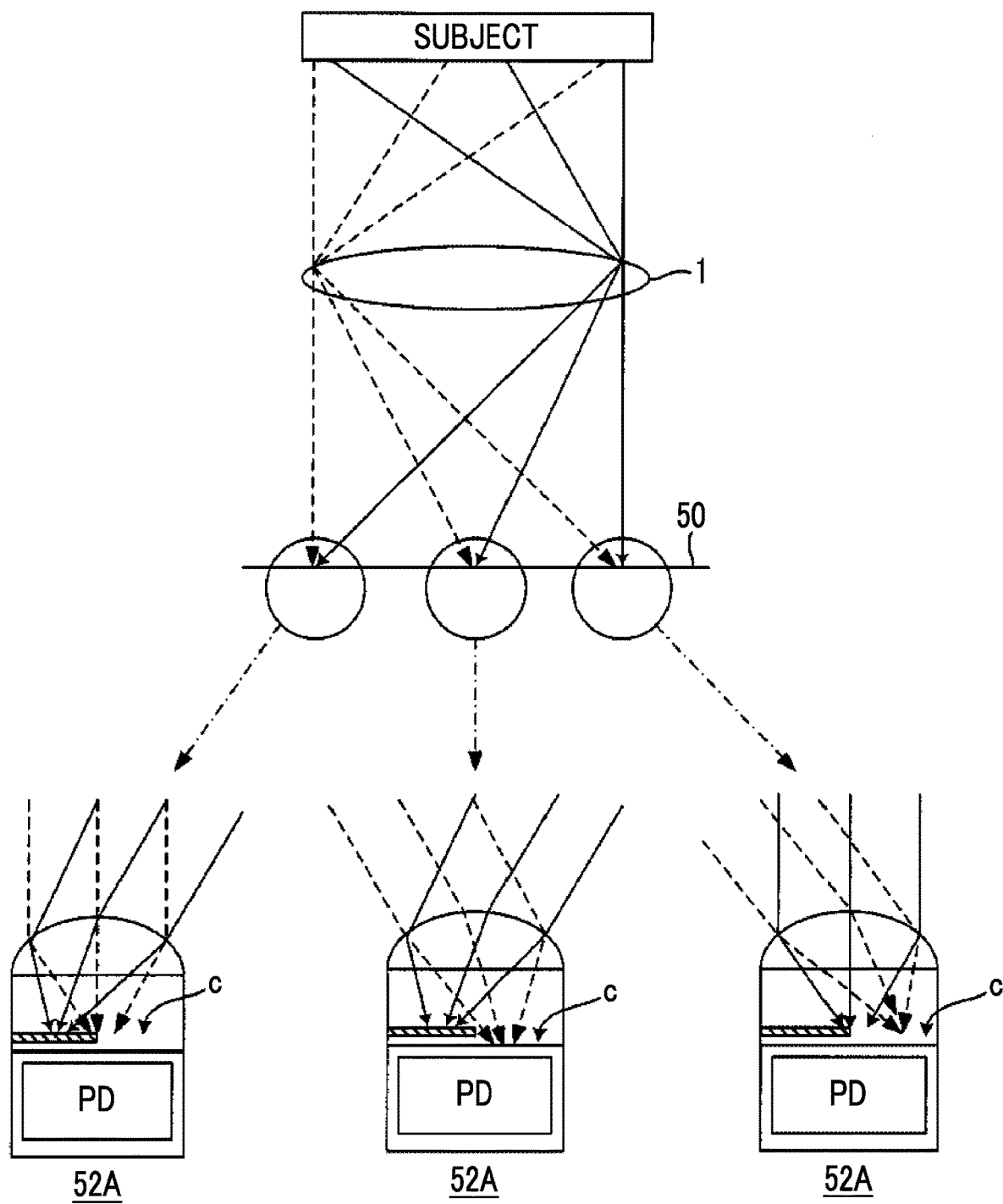
FIG. 5 is a diagram showing a cross-sectional configuration of a phase difference detection pixel 52A.

FIG. 5 is a diagram showing a cross-sectional configuration of the phase difference detection pixel 52A. As shown in FIG. 5, an opening c of the phase difference detection pixel 52A is shifted to the right side from the photoelectric conversion section (PD). As shown in FIG. 5, the one side of the photoelectric conversion section is covered with the light shielding film, and thus, light rays incident from a side opposite to the side covered with the light shielding film are selectively shielded.

With this configuration, it is possible to measure a phase difference amount between images captured by these two pixel groups, which include one pixel group including the phase difference detection pixels 52A present in an arbitrary row and the other pixel group including the phase difference detection pixels 52B arranged on one side of the phase difference detection pixels 52A of the one pixel group at the same distance, in the row direction X.

The imaging element 5 may include a plurality of pairs each including the first signal detection section that receives one of the pair of luminous fluxes passing through the different portions arranged in the row direction X of the pupil region of the imaging optical system and detects the signal corresponding to the light reception amount and the second signal detection section that receives the other one of the pair of luminous fluxes and detects the signal corresponding to the light reception amount, and is not limited to the configuration shown in FIGS. 2 to 5.

For example, all the pixels included in the imaging element 5 are the imaging pixels 51. The imaging pixel 51 is divided into two. One divided portion may be the phase difference detection pixel 52A, and the other divided portion may be the phase difference detection pixel 52B.

Figure 6:
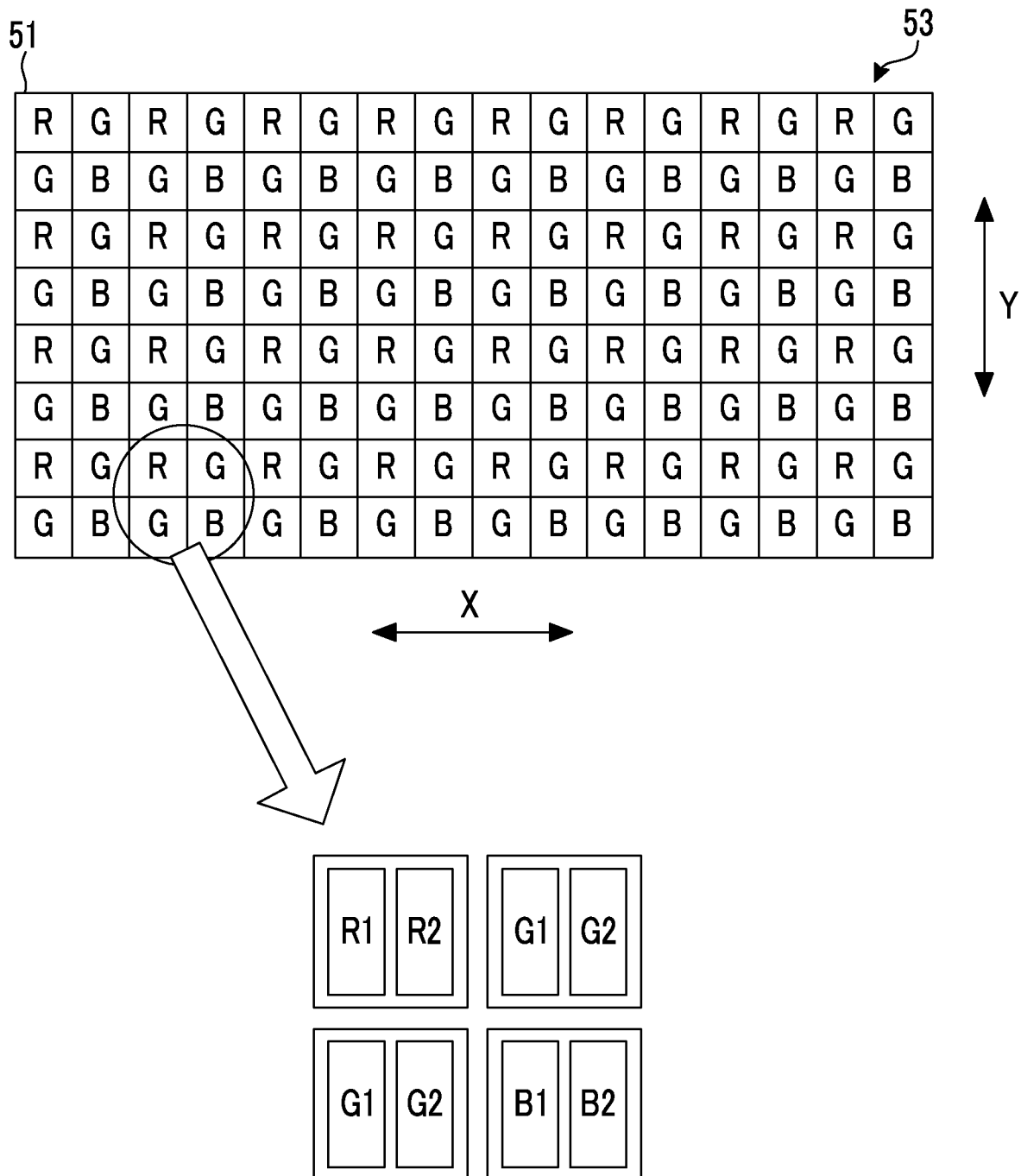
FIG. 6 is a diagram showing a configuration in which all pixels included in the imaging element 5 are imaging pixels 51 and each imaging pixel 51 is divided into two.

FIG. 6 is a diagram showing a configuration in which all the pixels included in the imaging element 5 are the imaging pixels 51 and the imaging pixels 51 are classified into two classification portions.

In the configuration of FIG. 6, the imaging pixel 51 assigned a character of R in the imaging element 5 is divided into two, and two divided portions are a phase difference detection pixel R1 and a phase difference detection pixel R2.

The imaging pixel 51 assigned a character of G in the imaging element 5 is divided into two, and two divided portions are a phase difference detection pixel G1 and a phase difference detection pixels G2.

The imaging pixel 51 assigned to a character of B in the imaging element 5 is divided into two, and two divided portions are a phase difference detection pixel B1 and a phase difference detection pixels B2.

In this configuration, the phase difference detection pixels R1, G1, and B1 are the first signal detection sections, and the phase difference detection pixels R2, G2, and B2 are the second signal detection sections. The signals may be independently read out of the first signal detection sections and the second signal detection sections.

In a case where the signals of the first signal detection sections and the second signal detection sections are added, typical imaging signals having no phase difference are acquired. That is, in the configuration of FIG. 6, all the pixels may be used as both of the phase difference detection pixels and the imaging pixels.

As stated above, the imaging element 5 constitutes a sensor having an AF area in which the plurality of first signal detection sections and the plurality of second signal detection sections are formed.

Figure 7:
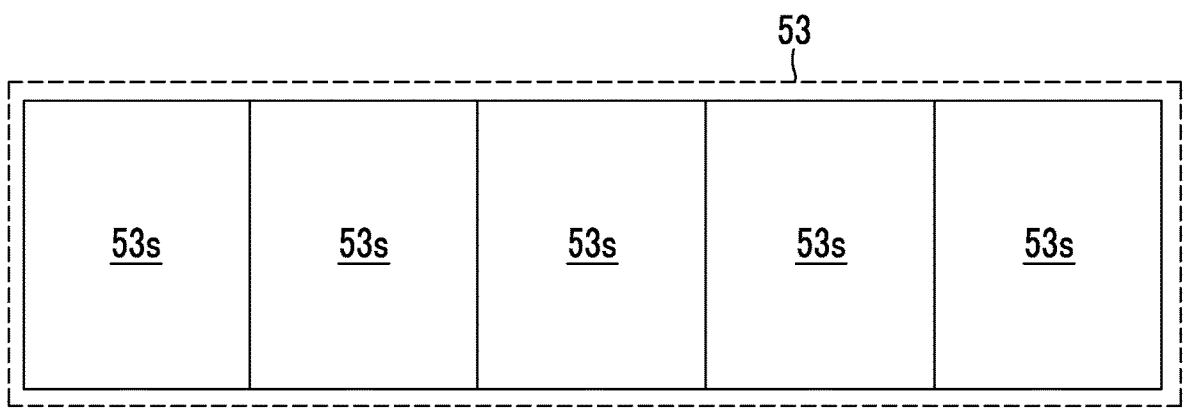
FIG. 7 is an enlarged view of one AF area 53 shown in FIG. 2.

FIG. 7 is an enlarged view of one AF area 53 shown in FIG. 2. As shown in FIG. 7, the AF area 53 includes five divided areas 53s divided in the row direction X which is a detection direction of the phase difference. The number of divided areas 53s is not limited to five, and may be in plural. The plurality of pairs of the phase difference detection pixels 52A and the phase difference detection pixels 52B is included in each divided area 53s.

Figure 8:
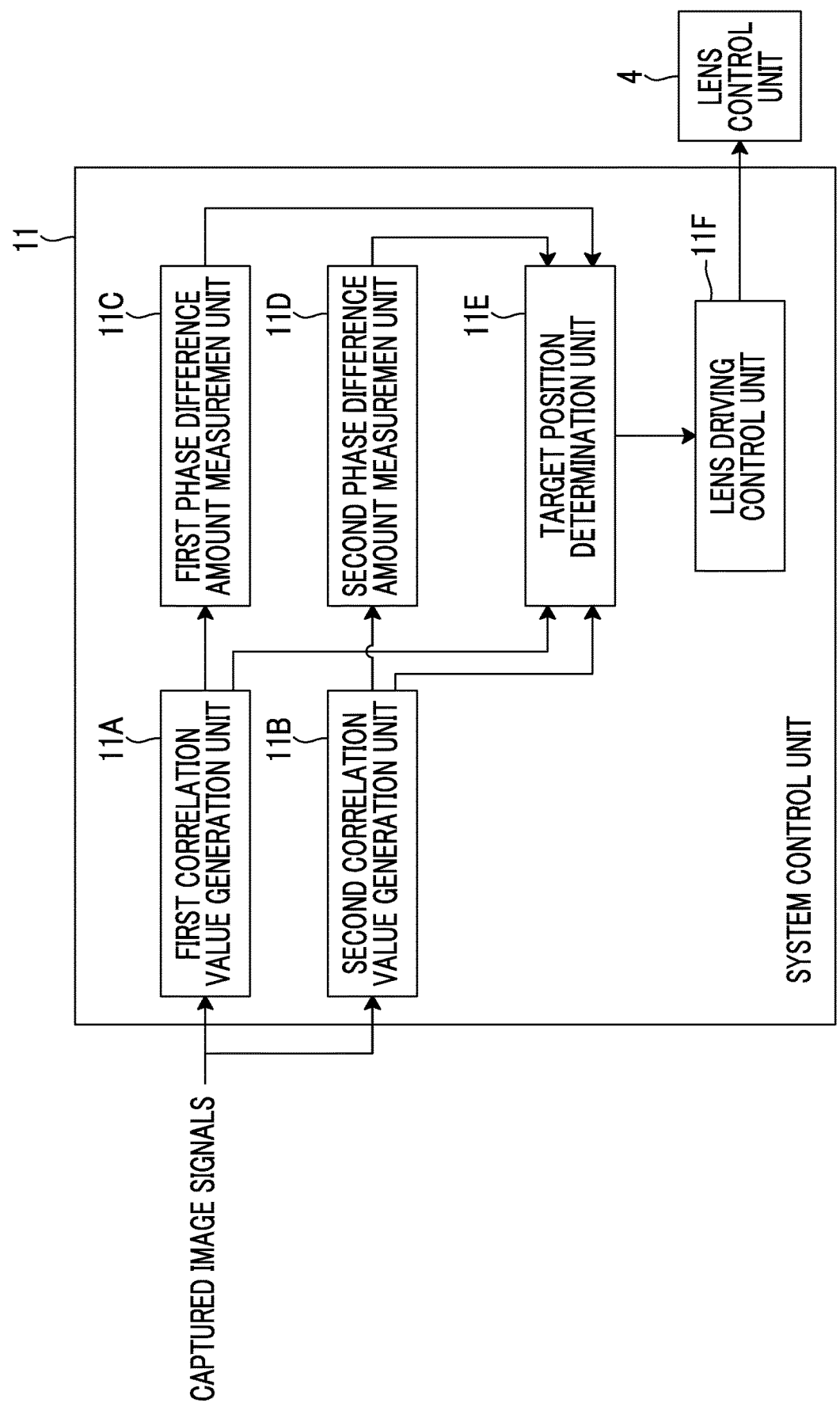
FIG. 8 is a functional block diagram of a system control unit 11 shown in FIG. 1.

FIG. 8 is a functional block diagram of the system control unit 11 shown in FIG. 1. The system control unit 11 functions as a first correlation value generation unit 11A, a second correlation value generation unit 11B, a first phase difference amount measurement unit 11C, a second phase difference amount measurement unit 11D, a target position determination unit 11E, and a lens driving control unit 11F by executing the focusing control program stored in the built-in ROM or the main memory 16.

The first correlation value generation unit 11A acquires correlation values between a first signal group output from the plurality of first signal detection sections (phase difference detection pixels 52A) and a second signal group output from the plurality of second signal detection sections (phase difference detection pixels 52B) which are present in all the AF areas 53.

The calculation of Expression (1) is performed by setting the first signal group as data A[k] and the second signal group as data B[k], and thus, the first correlation value generation unit 11A acquires the correlation values between the first signal group and the second signal group.

The second correlation value generation unit 11B acquires correlation values between a third signal group output from the plurality of first signal detection sections (phase difference detection pixels 52A) and a fourth signal group output from the plurality of second signal detection sections (phase difference detection pixels 52B) which are present in each of the five divided areas 53s constituting the AF area 53.

The calculation of Expression (1) is performed by setting the third signal group as data A[k] and the fourth signal group as data B[k], and thus, the second correlation value generation unit 11B acquires the correlation values between the third signal group and the fourth signal group.

For example, a case where 50 pairs each having the phase difference detection pixel 52A and the phase difference detection pixel 52B are arranged in the row direction X in the AF area 53 is considered. In this case, 10 pairs are arranged in the row direction X in each divided area 53s.

In this example, the first correlation value generation unit 11A acquires the correlation values between the first signal group and the second signal group output from the 50 pairs included in the AF area 53. The second correlation value generation unit 11B acquires the correlation values between the third signal group and the fourth signal group output from the 10 pairs included in each divided area 53s.

The first phase difference amount measurement unit 11C measures a first phase difference amount between the first signal group and the second signal group from the correlation values acquired by the first correlation value generation unit 11A.

Specifically, the first phase difference amount measurement unit 11C measures a shift amount between the first signal group and the second signal group at which the correlation value acquired by the first correlation value generation unit 11A is minimum, as the first phase difference amount.

The second phase difference amount measurement unit 11D measures a second phase difference amount between the third signal group and the fourth signal group for each divided area 53s from the correlation values for each divided area 53s acquired by the second correlation value generation unit 11B.

Specifically, the second phase difference amount measurement unit 11D measures the shift amount between the third signal group and the fourth signal group at which the correlation value acquired by the second correlation value generation unit 11B is minimum in an arbitrary divided area 53s, as the second phase difference amount in the arbitrary divided area 53s.

The target position determination unit 11E selectively performs a first process of determining a target position of the focus lens based on the first phase difference amount and a second process of determining the target position of the focus lens based on the second phase difference amount based the correlation values acquired by the first correlation value generation unit 11A and the correlation values acquired by the second correlation value generation unit 11B.

Specifically, the target position determination unit 11E determines reliability of the target position determined through the second process based on the correlation values acquired by the first correlation value generation unit 11A and the correlation values acquired by the second correlation value generation unit 11B. The target position determination unit performs the first process in a case where the reliability is equal to or lower than a threshold value, and performs the second process in a case where the reliability exceeds the threshold value.

The reliability of the target position determined through the second process is information indicating the magnitude of a possibility that an image on which the subject being captured by any one of divided areas 53s is in focus will be acquired in a case where the focus lens moves to the target position. In a case where the reliability exceeds the threshold value, there is a high possibility that an image on which a subject intended by a capturer is in focus will be acquired, and in a case where the reliability is equal to or less than the threshold value, there is a low possibility that an image on which the subject intended by the capturer is in focus will be acquired.

The lens driving control unit 11F controls the lens control unit 4 to drive the focus lens to the target position determined through the first process or the second process.

Figure 9:
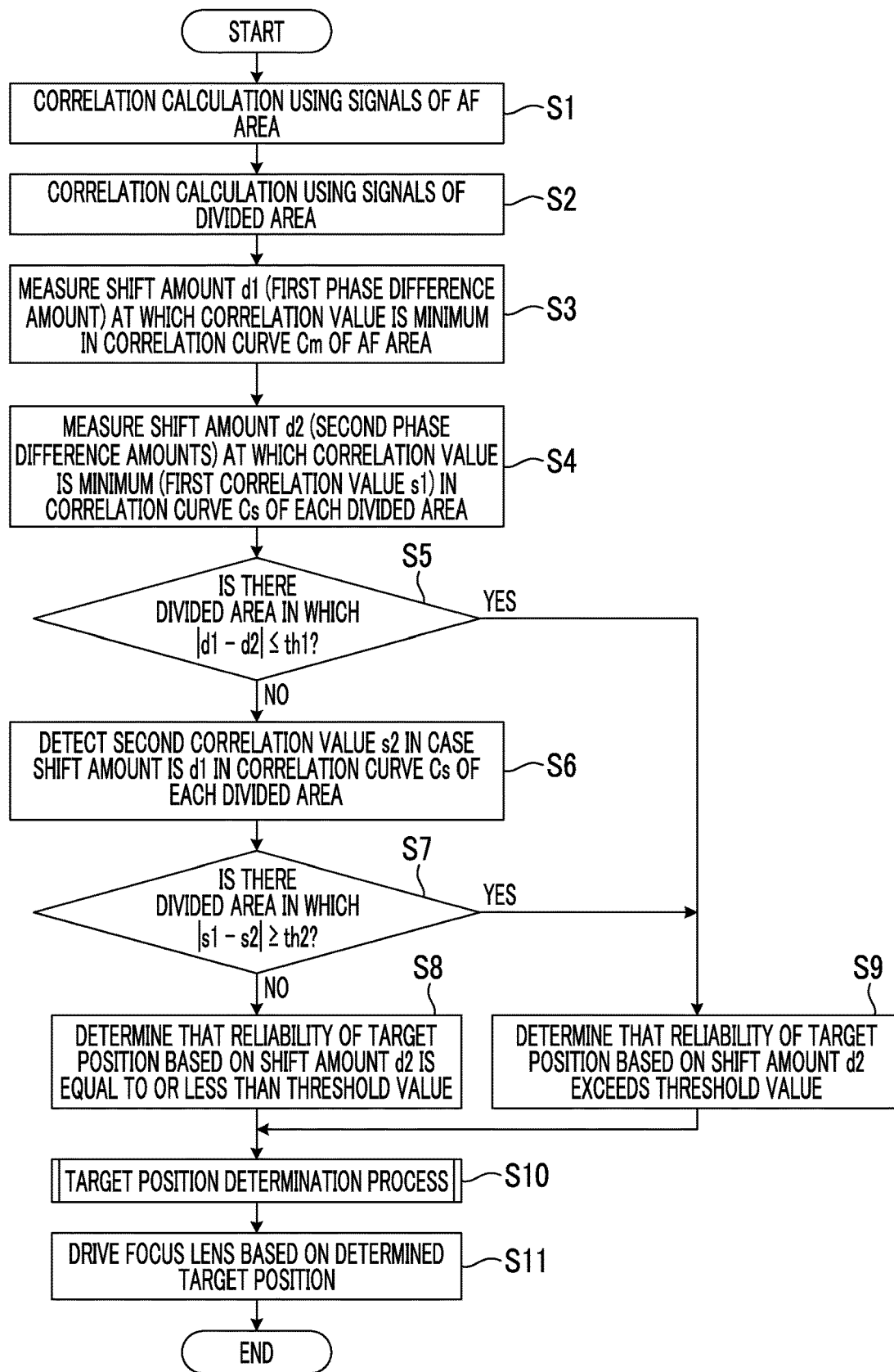
FIG. 9 is a flowchart for describing a focusing control operation by means of the system control unit 11 shown in FIG. 8.

FIG. 9 is a flowchart for describing a focusing control operation by means of the system control unit 11 shown in FIG. 8. An instruction to perform AF is input to the system control unit 11 by operating the operating unit 14 in a state in which an arbitrary AF area is selected by a user of the digital camera from the nine AF areas 53, and thus, the flow shown in FIG. 9 is started.

In a case where the instruction to perform AF is input, the imaging for AF is performed by the imaging element 5, and the captured image signals acquired through the imaging are input to the system control unit 11.

The first correlation value generation unit 11A performs a first correlation value generation step of acquiring the correlation values between the first signal group and the second signal group by performing correlation calculation of the first signal group output from the phase difference detection pixels 52A and the second signal group output from the phase difference detection pixels 52B which are included in the selected AF area 53 among the captured image signals (step S1).

The second correlation value generation unit 11B performs a second correlation value generation step of acquiring the correlation values between the third signal group and the fourth signal group for each of the divided areas 53s by performing correlation calculation of the third signal group output from the phase difference detection pixels 52A and the fourth signal group output from the phase difference detection pixels 52B which are included in each divided area 53s constituting the selected AF area 53 among the captured image signals (step S2).

Figure 10:
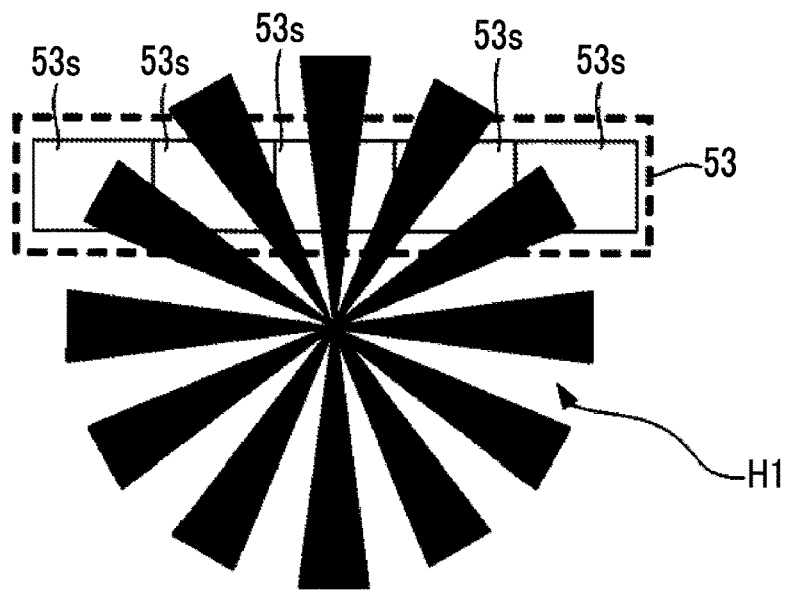
FIG. 10 is a diagram showing an example in which a subject H1 having regular patterns is captured by the AF area 53.
Figure 11:
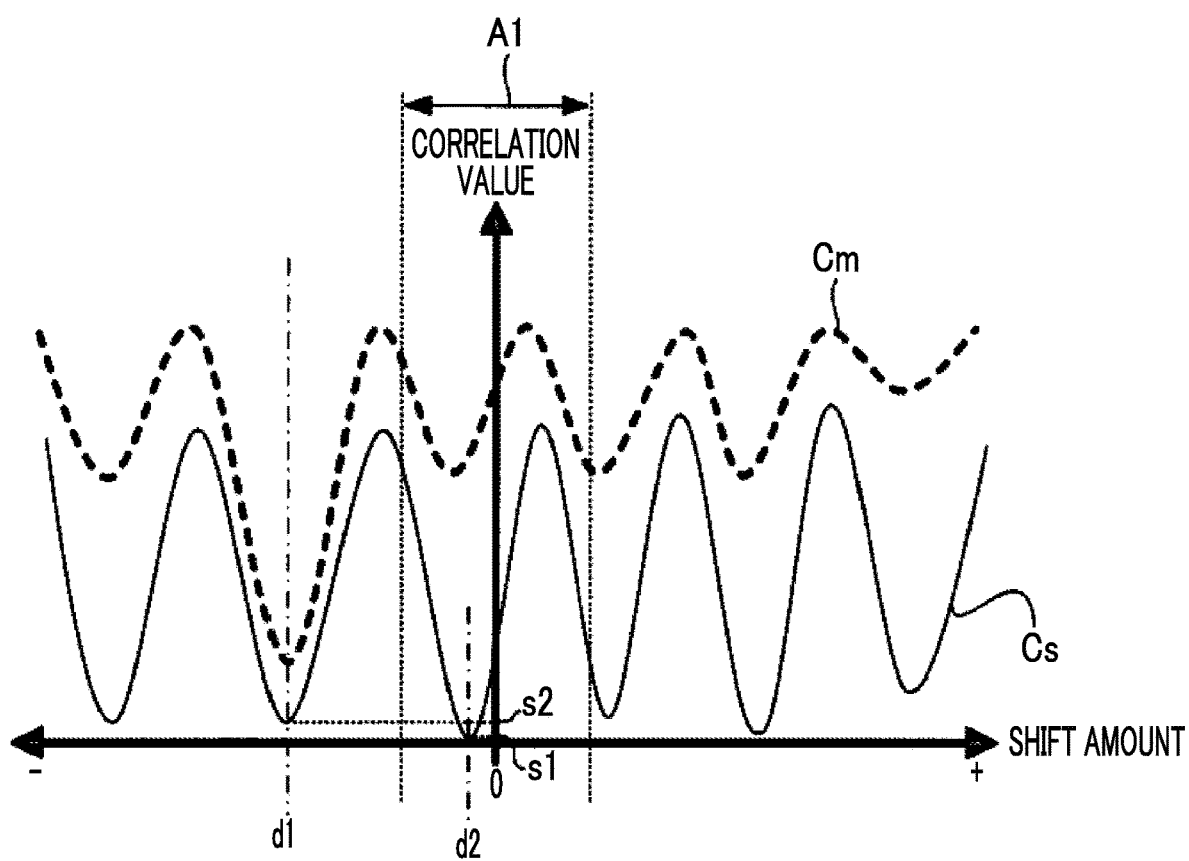
FIG. 11 is a graph showing the result of correlation values acquired for the AF area 53 shown in FIG. 10 and one divided area 53s constituting the AF area 53.

FIG. 10 is a diagram showing an example in which a subject H1 having regular patterns is captured by the AF area 53. FIG. 11 is a graph showing the result of the correlation values acquired for the AF area 53 shown in FIG. 10 and one divided area 53s constituting the AF area.

Figure 12:
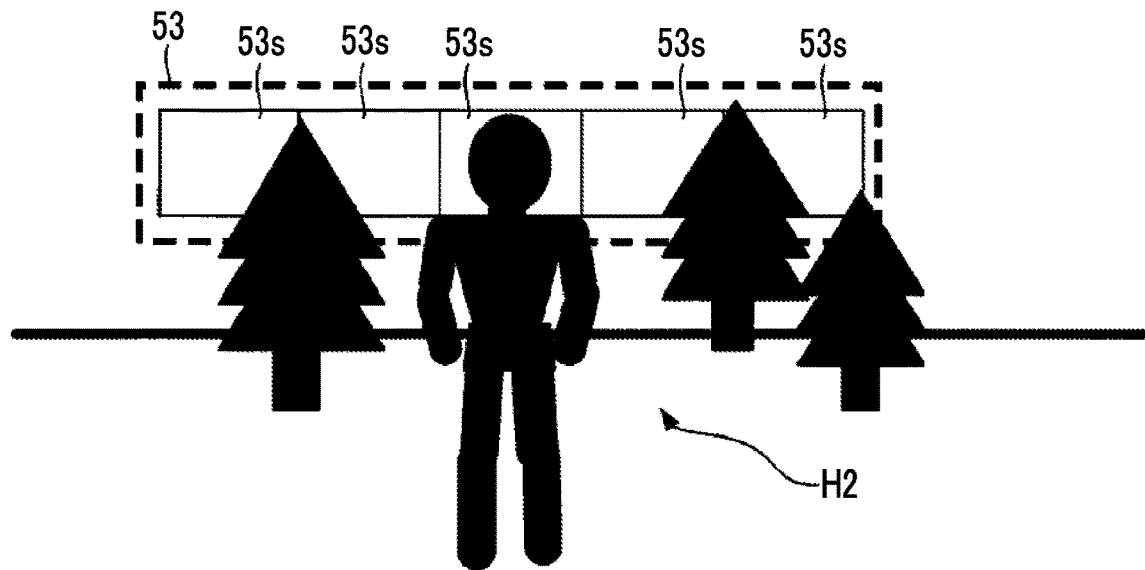
FIG. 12 is a diagram showing an example in which a subject H2 including a main subject (person) and background objects (trees) is captured by the AF area 53.
Figure 13:
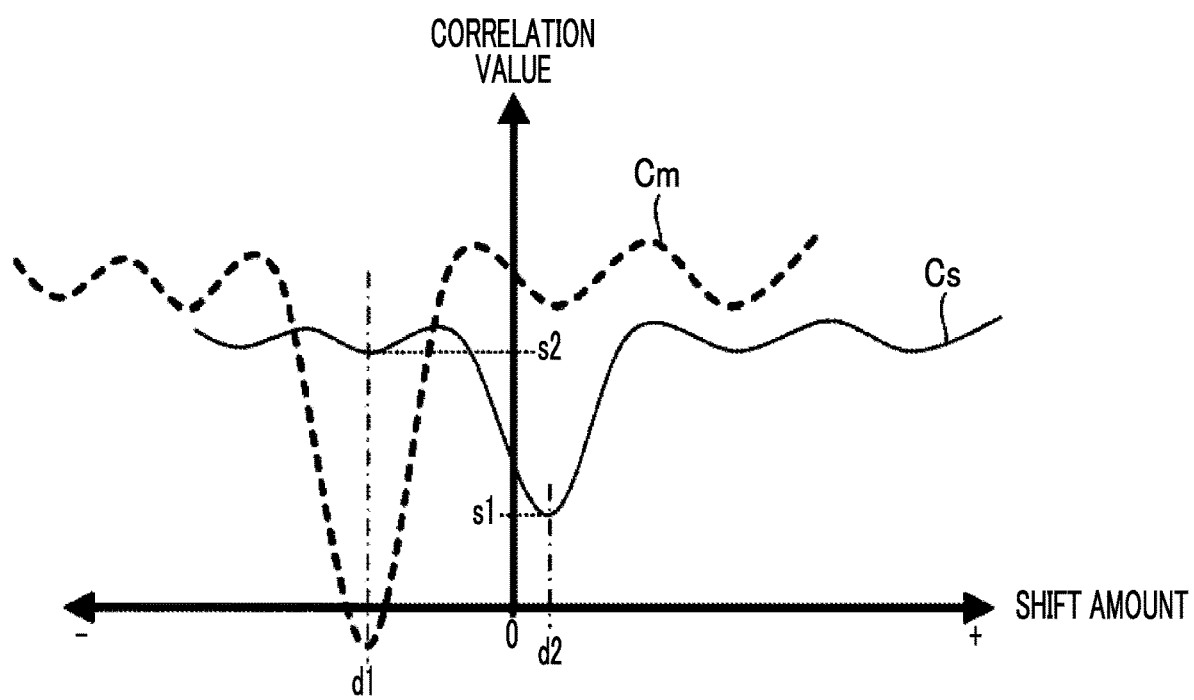
FIG. 13 is a graph showing the result of correlation values for the AF area 53 shown in FIG. 12 and one divided area 53s constituting the AF area.

FIG. 12 is a diagram showing an example in which a subject H2 including a main subject (person) and background objects (trees) is captured by the AF area 53. FIG. 13 is a graph showing the result of the correlation values acquired for the AF area 53 shown in FIG. 12 and one divided area 53s constituting the AF area.

In FIGS. 11 and 13, the results of the correlation calculation are represented as graphs in which a horizontal axis depicts the shift amount between two signal groups and a vertical axis depicts the correlation value between two signal group.

In FIGS. 11 and 13, a curve (correlation curve Cm) of the correlation values acquired in step S1 and a curve (correlation curve Cs) of the correlation values acquired for an arbitrary divided area 53s in step S2 are illustrated. Hereinafter, the curve of the correlation values acquired in each of five divided areas 53s is referred to as the correlation curve Cs.

After step S2, the first phase difference amount measurement unit 11C measures a shift amount d1 (see FIGS. 11 and 13) at which the correlation value is minimum in the correlation curve Cm acquired in step S1, as the first phase difference amount (step S3).

Subsequently, the second phase difference amount measurement unit 11D measures a shift amount d2 (see FIGS. 11 and 13) at which the correlation value is minimum in each correlation curve Cs acquired in step S2, as the second phase difference amount (step S4). As shown in FIGS. 11 and 13, the correlation value corresponding to the shift amount d2 in each correlation curve Cs is a first correlation value s1.

Subsequently, the target position determination unit 11E determines whether or not there is the divided area 53s in which a difference (an absolute value without regard to its sign) between the shift amount d1 and the shift amount d2 is equal to or less than a shift amount threshold value th1 (step S5). Although not shown, the process of step S8 is performed in a case where the shift amount d2 is not able to be measured in each divided area 53s in the process of step S4.

In a case where the determination result of step S5 is YES, the target position determination unit 11E determines that the reliability of the second process of determining the target position of the focus lens exceeds the threshold value based on the shift amount d2 (step S9).

In a case where the determination result of step S5 is YES, it may be determined that the substantially same subject is captured by the AF area 53 and any of the five divided areas 53s. Thus, the target position determination unit 11E may determine that determination accuracy of the target position in a case where the target position is determined by using the result of the correlation calculation in the divided area 53s is high.

In a case where the determination result of step S5 is NO, the target position determination unit 11E detects a second correlation value s2 (see FIGS. 11 and 13) which is the correlation value corresponding to the shift amount d1 in each correlation curve Cs acquired in step S2 (step S6).

After step S6, the target position determination unit 11E determines whether or not there is the divided area 53s in which the difference between the first correlation value s1 and the second correlation value s2 is equal to or greater than a correlation threshold value th2 (step S7).

In a case where it is determined that there is the divided area 53s in which the difference between the first correlation value s1 and the second correlation value s2 is equal to or greater than the correlation threshold value th2, the target position determination unit 11E performs the process of step S9.

Meanwhile, in a case where it is determined that there is no divided area 53s in which the difference between the first correlation value s1 and the second correlation value s2 is equal to or greater than the correlation threshold value th2, the target position determination unit 11E determines that the reliability of the second process of determining the target position of the focus lens is equal to or less than the threshold value based on the shift amount d2 (step S8).

A state in which the difference between the shift amount d1 and the shift amount d2 is large and the difference between the second correlation value s2 and the first correlation value s1 is small is a state shown in FIG. 11. In such a state, it may be determined that the correlation curve Cs repeatedly increases and decreases. Thus, it may be determined that repeated patterns shown in FIG. 10 are captured.

Meanwhile, a state in which the difference between the shift amount d1 and the shift amount d2 is large and the difference between the second correlation value s2 and the first correlation value s1 is large is a state shown in FIG. 13. In such a state, it may be determined that the correlation curve Cs does not repeatedly increase and decrease. Thus, it may be determined that the repeated patterns shown in FIG. 10 are not captured.

Accordingly, in a case where the determination result of step S7 is YES, it may be determined that the reliability of the second process is high, and in a case where the determination result of step S7 is NO, it may be determined that the reliability of the second process is low.

After step S8 and step S9, a process of determining the target position of the focus lens is performed by the target position determination unit 11E (step S10).

In step S10, in a case where the process of step S8 is performed, the target position determination unit 11E converts the shift amount d1 measured in step S3 into a defocus amount, and determines the target position of the focus lens based on the defocus amount.

In step S10, in a case where the process of step S9 is performed, the target position determination unit 11E converts a minimum value of the shift amounts d2 in the divided areas 53s measured in step S4 or an average value of the shift amounts d2 in the divided areas 53s into a defocus amount, and determines the target position of the focus lens based on the defocus amount.

In a case where the process of step S9 is performed, the target position determination unit 11E selects the divided area 53s in which the difference between the shift amount d1 and the shift amount d2 is equal to or less than the shift amount threshold value th1 and the divided area 53s in which the difference between the shift amount d1 and the shift amount d2 exceeds the shift amount threshold value th1 and the difference between the second correlation value s2 and the first correlation value s1 is equal to or greater than the correlation threshold value th2, among the divided areas 53s, and extracts the shift amounts d2 acquired in the selected divided areas 53s.

The target position determination unit 11E may convert a minimum value of the extracted shift amounts d2 or an average value of the extracted shift amounts d2 into a defocus amount, and may determine the target position of the focus lens based on the defocus amount.

After step S10, the lens driving control unit 11F performs a lens driving control step of moving the focus lens to the target position determined in step S10 (step S11), and the AF operation is ended.

As stated above, according to the digital camera of FIG. 1, in a case where the subject in which it is difficult to determine the minimum value of the correlation curve Cs is captured as shown in FIG. 11, focusing control is performed based on the first phase difference amount which is the shift amount corresponding to the minimum value of the correlation curve Cm. Thus, it is possible to focus on the subject with high accuracy even in a case where the subject having regular patterns shown in FIG. 10 is captured.

According to the digital camera of FIG. 1, in a case where the subject in which it is easy to determine the minimum value of the correlation curve Cs is captured as shown in FIG. 13, focusing control is performed based on the second phase difference amount which is the shift amount corresponding to the minimum value of the correlation curve Cs. Thus, it is possible to reduce a possibility that the subject other than the main subject will be in focus, and it is possible to focus on the main subject with high accuracy.

According to the digital camera of FIG. 1, in a case where the shift amounts d2 are not able to be measured in the divided areas 53s in the process of step S4 of FIG. 9, the process of step S8 is performed.

Since the divided area 53s is an area smaller than the AF area 53, in a case where an image captured by the AF area 53 is greatly blurred, the correlation curve Cs in each divided area 53s is a gentle curve, and the shift amount d2 is not able to be measured.

Even in such a case, since there is a high possibility that the minimum value of the correlation curve Cm will be calculated in the AF area 53, the focus lens is driven based on the shift amount corresponding to the minimum value of the correlation curve Cm, and thus, it is possible to focus on even a greatly blurred subject.

In step S4 of FIG. 9, the shift amount d2 at which the correlation value is minimum is measured by using the entire correlation curve Cs (a range in which the shift amount between the third signal group and the fourth signal group are acquired) as a target.

However, in the correlation curve Cs, the shift amount d2 at which the correlation value is minimum may be measured by using a predetermined range including a shift amount of zero as a target.

For example, in step S4 of FIG. 9, the shift amount d2 at which the correlation value is minimum may be searched for in a range A1 shown in FIG. 11. With a shape in which the correlation curve Cs repeatedly increases and decreases as shown in FIG. 11, the subject H1 shown in FIG. 10 is in focus some extent.

That is, in a case where the focus lens is present near the focusing position, the correlation curve Cs shown in FIG. 11 is acquired. Accordingly, even though the range in which the shift amount d2 is searched for is limited to the range A1 of the shift amount corresponding to a range including the current position of the focus lens, it is possible to determine whether or not the shape of the correlation curve Cs is the shape shown in FIG. 11.

As mentioned above, in step S4 of FIG. 9, the searching range of the shift amount d2 is limited to a part of a range from one end of the shift amount of the correlation curve Cs to the other end, and thus, it is possible to reduce the calculation amount of the system control unit 11. Accordingly, it is possible to achieve a decrease in power consumption and an increase in speed of the AF.

In the following description, in step S10, in a case where the reliability of the target position based on the shift amount d2 exceeds the threshold value, the target position is determined based on the shift amount d2. However, in this case, the target position may be determined based on the shift amount d1 depending on the situation of the subject being captured. Hereinafter, modification examples of step S10 will be described.

First Modification Example

Figure 14:
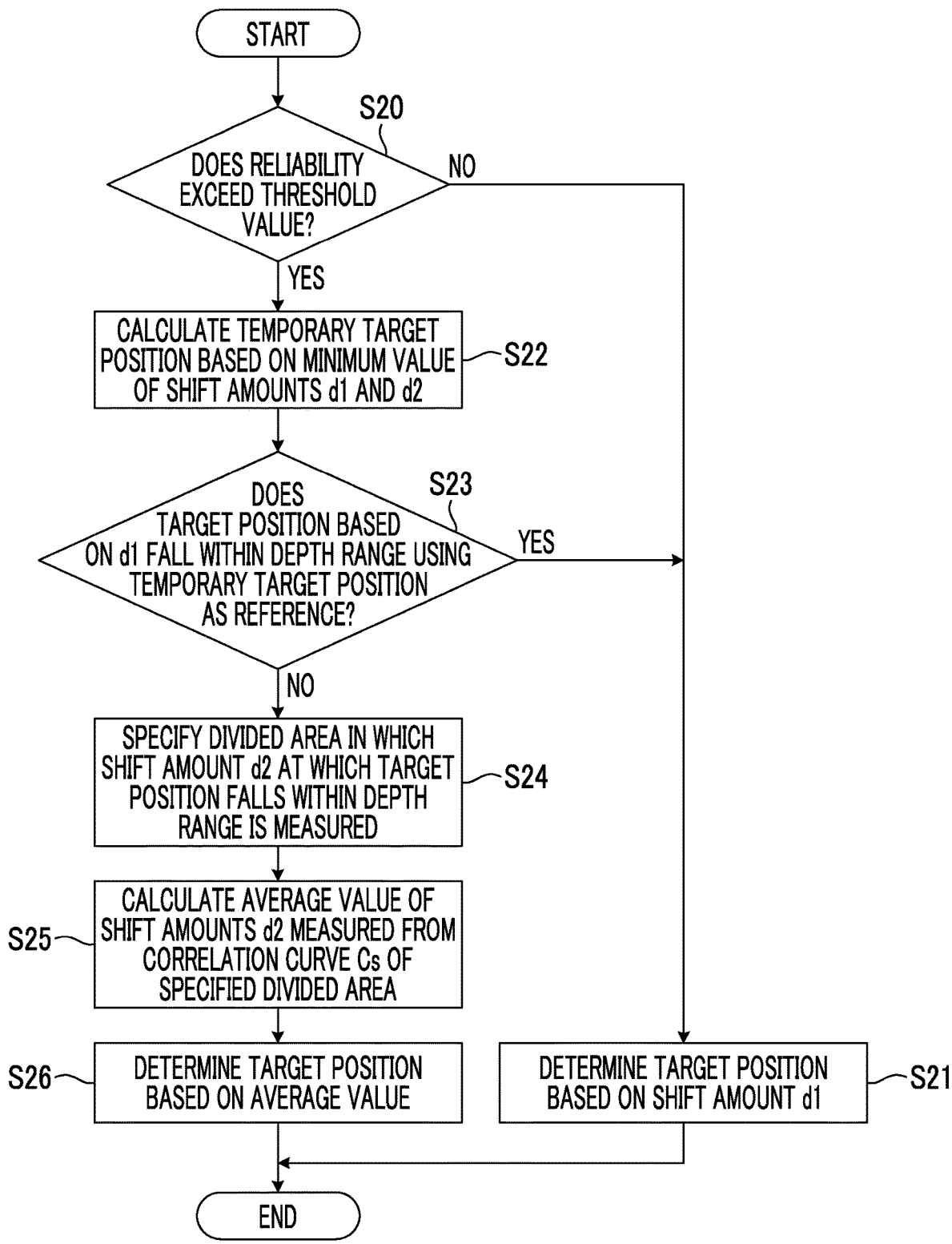
FIG. 14 is a flowchart for describing a first modification example of the focusing control operation by means of the system control unit 11 of the digital camera of FIG. 1.

FIG. 14 is a flowchart for describing a first modification example of the focusing control operation by means of the system control unit 11 of the digital camera of FIG. 1. The flowchart shown in FIG. 14 is a flowchart showing the details of step S10 of FIG. 9.

In a case where it is determined that the reliability of the target position based on the shift amount d2 is equal to or less than the threshold value (step S20: NO), the target position determination unit 11E determines the target position based on the shift amount d1 measured in step S3 of FIG. 9 (step S21).

Specifically, the target position determination unit 11E converts the shift amount d1 into a defocus amount, and determines the target position of the focus lens from the defocus amount and the current position of the focus lens.

In a case where it is determined that the reliability of the target position based on the shift amount d2 exceeds the threshold value (step S20: YES), the target position determination unit 11E extracts a minimum value of the shift amount d1 and the shift amounts d2 measured for each divided area 53s, and calculates a temporary target position of the focus lens based on the extracted minimum value (step S22).

Specifically, the target position determination unit 11E converts the extracted minimum value into the defocus amount, and determines the temporary target position of the focus lens from the defocus amount and the current position of the focus lens. The temporary target position is a position of the target positions based on the shift amount d1 and the shift amounts d2 measured for the divided areas 53s, which is closest to the current position of the focus lens.

Subsequently, the target position determination unit 11E determines the target position of the focus lens based on the shift amount d1 measured in step S3, and determines whether or not the target position falls within a predetermined depth range using the temporary target position calculated in step S22 in the movement direction of the focus lens as the reference (step S23).

The depth range is set to a very narrow range such as one to two times the depth of field in a case where it is assumed that the focus lens is present in the temporary target position. The depth range is set on one side in the movement direction of the focus lens by using the temporary target position as a starting point.

In a case where the determination result of step S23 is YES, the target position determination unit 11E performs the process of step S21.

In a case where the determination result of step S23 is NO, the target position determination unit 11E determines the target positions of the focus lens for the divided areas 53s based on the shift amounts d2 measured for the divided areas 53s, and specifies the divided areas 53s in which the target position falls within the depth range (step S24).

Subsequently, the target position determination unit 11E calculates an average value of the shift amounts d2 measured for the divided areas 53s specified in step S24 (step S25), and determines a final target position based on the calculated average value (step S26).

Specifically, the target position determination unit 11E converts the average value into a defocus amount, and determines the final target position of the focus lens from the defocus amount and the current position of the focus lens.

After the processes of step S26 and step S21, the focus lens is driven to the determined target position in step S11 of FIG. 9.

As stated above, according to the first modification example, in a case where the reliability of the target position based on the shift amount d2 exceeds the threshold value, the focus lens is not driven to the temporary target position, the divided areas 53s of which the target position based on the shift amount d2 falls within the depth range using the temporary target position as the reference are specified, and the target position is determined based on the average value of the shift amounts d2 measured for the specified divided areas 53s.

Figure 15A:
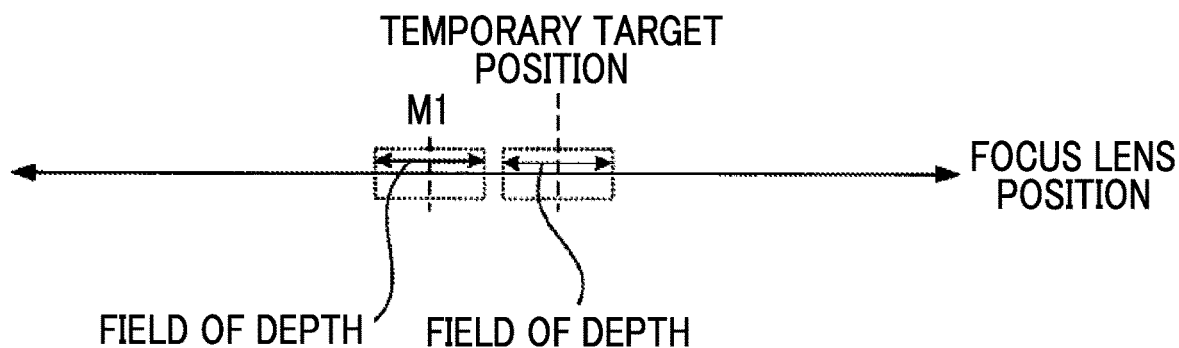
FIGS. 15A and 15B are schematic diagrams for describing a depth range.
Figure 15B:
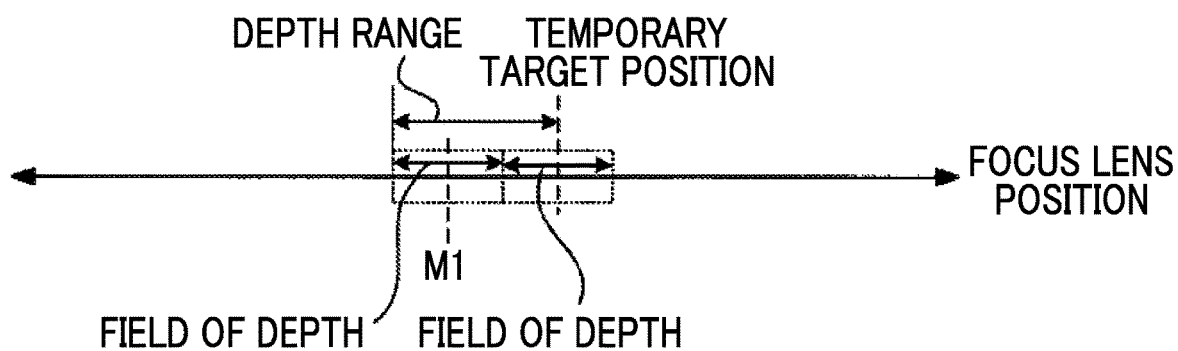

FIGS. 15A and 15B are schematic diagrams for describing the depth range. In FIGS. 15A and 15B, examples in which two phase difference amounts are measured are illustrated. The target position based on the minimum value of the two phase difference amounts is the temporary target positions in FIGS. 15A and 15B. A target position based on another phase difference amount is M1. In a case where it is assumed that the focus lens is present in the target position, a range in which it is determined that the target is in focus is the depth of field.

In a state shown in FIG. 15A, a state in which both a subject corresponding to the target position M1 and a subject corresponding to the temporary target position are in focus is not able to be realized in a case where the focus lens moves to the target position based on an average value of the shift amounts d2 corresponding to the temporary target position and the target position M1.

In a case where a range which is two times the depth of field using the temporary target position as its center is set to the depth range, the target position M1 overlaps the depth range as shown in FIG. 15B. In this case, the focus lens moves to the target position based on an average value of the shift amounts corresponding to the temporary target position and the target position M1. Thus, a state in which both the subject corresponding to the target position M1 and the subject corresponding to the temporary target position are in focus is able to be realized. Accordingly, the depth range is set within the range which is two times the depth of field.

According to the first modification example, in a case where a subject H3 which extends in a direction which is not perpendicular to and is not horizontal to the optical axis direction of the imaging optical system is captured as shown in FIG. 16, it is possible to focus on the entire subject H3. FIG. 16 shows a state in which an imaging surface including the AF area 53 is viewed in a direction horizontal to the imaging surface.

In the example of FIG. 16, it is assumed that the target position based on the shift amount d2 measured for the divided area 53s located at a left end among the five divided areas 53s is the temporary target position and the target positions based on the shift amounts d2 measured for the second and third divided areas 53s from the left among the five divided areas 53s fall within the depth range using the temporary target position as its reference.

In this case, the target position of the focus lens is determined in not an end portion of the subject H3 close to the digital camera but in a position which is slightly separated from the digital camera so as to be farther than the end portion based on an average value of the shift amounts d2 measured for the three divided areas 53s.

As stated above, in the first modification example, it is possible to focus on the entire subject diagonal to the digital camera in the example of FIG. 16 compared to a case where the focus lens is driven to the temporary target position, and it is possible to acquire an image on which the entire person is in focus even in a case where the person is diagonally pictured.

Even in a case where the subject H3 shown in FIG. 16 moves in the optical axis direction of the imaging optical system and another subject is present in the temporary target position of FIG. 16, it is possible to focus on the subject H3 without focusing on the another subject, and it is possible to continue to focus on an intended subject.

In the first modification example, in a case where the target position based on the shift amount d1 falls within the depth range using the temporary target position as the reference, the final target position is determined based on the shift amount d1. In this case, it is possible to acquire a state in which the entire subject H3 is in focus by performing the focusing control by a large AF area 53.

As stated above, according to the first modification example, in a case where the reliability of the target position based on the shift amount d2 exceeds the threshold value, it is possible to selectively perform the focusing control using the AF area 53 and the focusing control using the divided areas 53s. Thus, it is possible to perform optimum focusing control depending on an imaging scene, and it is possible to realize high focusing accuracy in various scenes.

Second Modification Example

Figure 17:
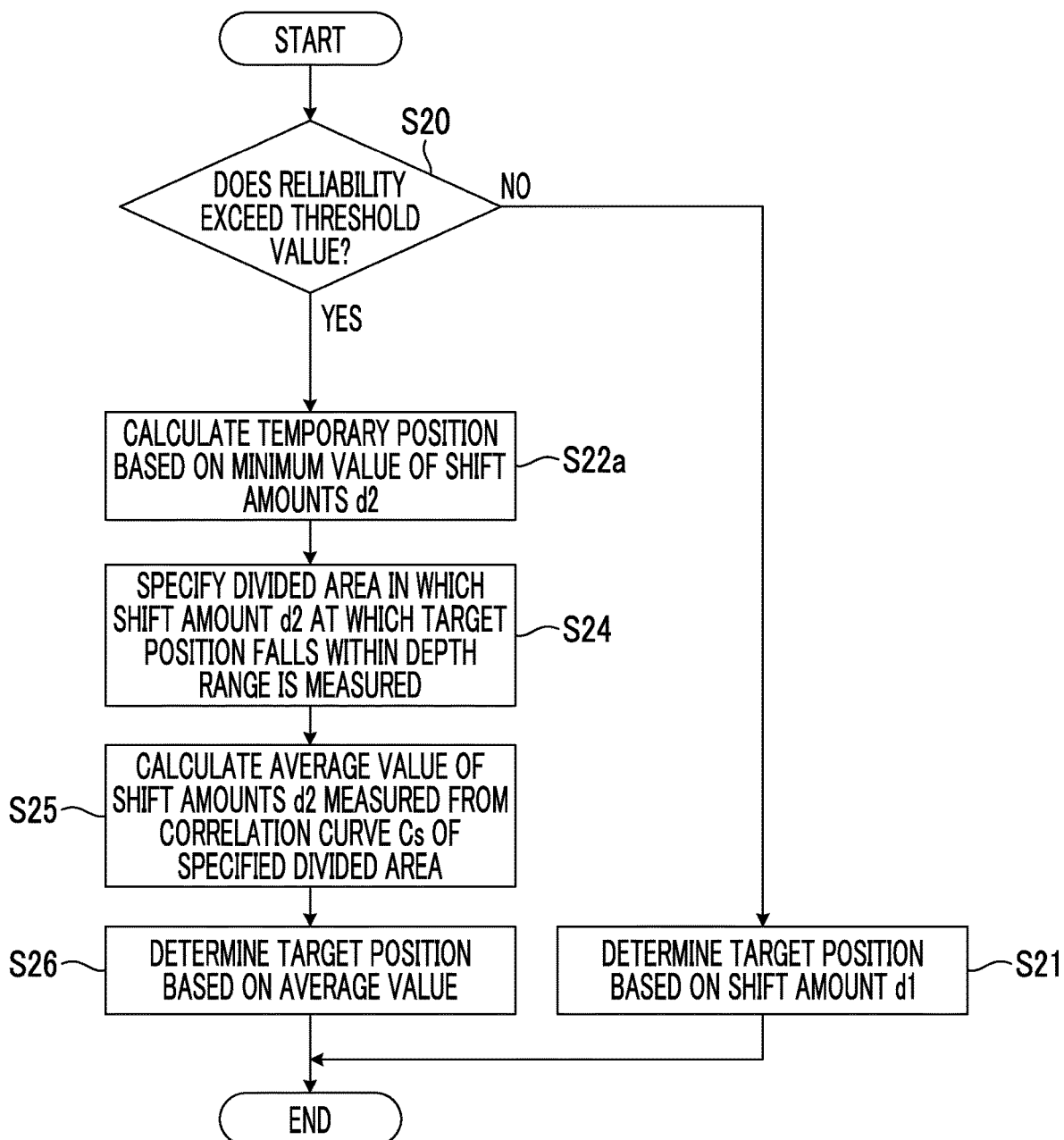
FIG. 17 is a flowchart for describing a second modification example of the focusing control operation by means of the system control unit 11 of the digital camera of FIG. 1.

FIG. 17 is a flowchart for describing a second modification example of the focusing control operation by means of the system control unit 11 of the digital camera of FIG. 1. The flowchart shown in FIG. 17 is a flowchart showing the details of step S10 of FIG. 9.

The flowchart shown in FIG. 17 is different from the flowchart of FIG. 14 in that step S23 is removed and step S22 is changed to step S22a. In FIG. 17, the same processes as those of FIG. 14 will be assigned the same references, and the description thereof will be omitted. Only change points from FIG. 14 will be described.

In a case where the determination result of step S20 is YES, the target position determination unit 11E extracts a minimum value of the shift amounts d2 measured for the divided areas 53s, and calculates the temporary target position of the focus lens based on the extracted minimum value (step S22a).

After step S22a, the processes of steps S24 to S26 are performed.

Similarly to the first modification example, according to the second modification example, in a case where the subject H3 which extends in a direction which is not perpendicular to and is not horizontal to the optical axis direction of the imaging optical system is captured, it is possible to focus on the entire subject H3.

Third Modification Example

Figure 18:
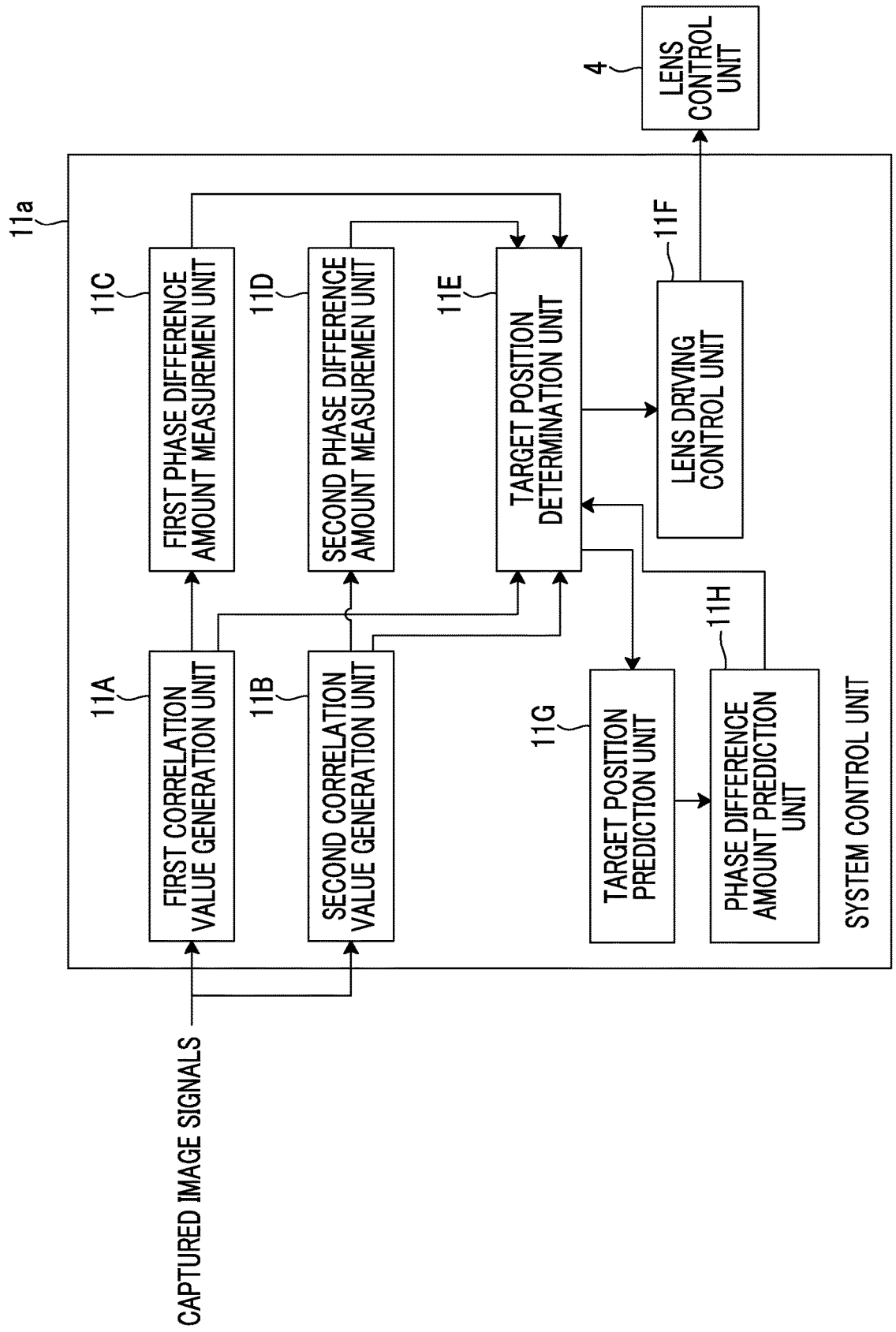
FIG. 18 is a functional block diagram of a system control unit 11a which is a modification example of the system control unit 11.

In this modification example, the system control unit 11 of the digital camera shown in FIG. 1 is changed to a system control unit 11a. FIG. 18 is a functional block diagram of the system control unit 11a.

The system control unit 11a has the same configuration as that of the system control unit 11 except that a target position prediction unit 11G and a phase difference amount prediction unit 11H are added. In FIG. 18, the same components as those of FIG. 8 will be assigned the same references.

The target position prediction unit 11G and the phase difference amount prediction unit 11H are functional blocks realized by a processor of the system control unit 11a that executes the focusing control program.

The target position prediction unit 11G predicts a target position of the focus lens at the time of the next AF based on a target position history of the focus lens determined by the target position determination unit 11E.

The phase difference amount prediction unit 11H converts a difference between the current position of the focus lens and the target position predicted by the target position prediction unit 11G into a phase difference amount, and predicts a phase difference amount at the time of the next AF.

Figure 19:
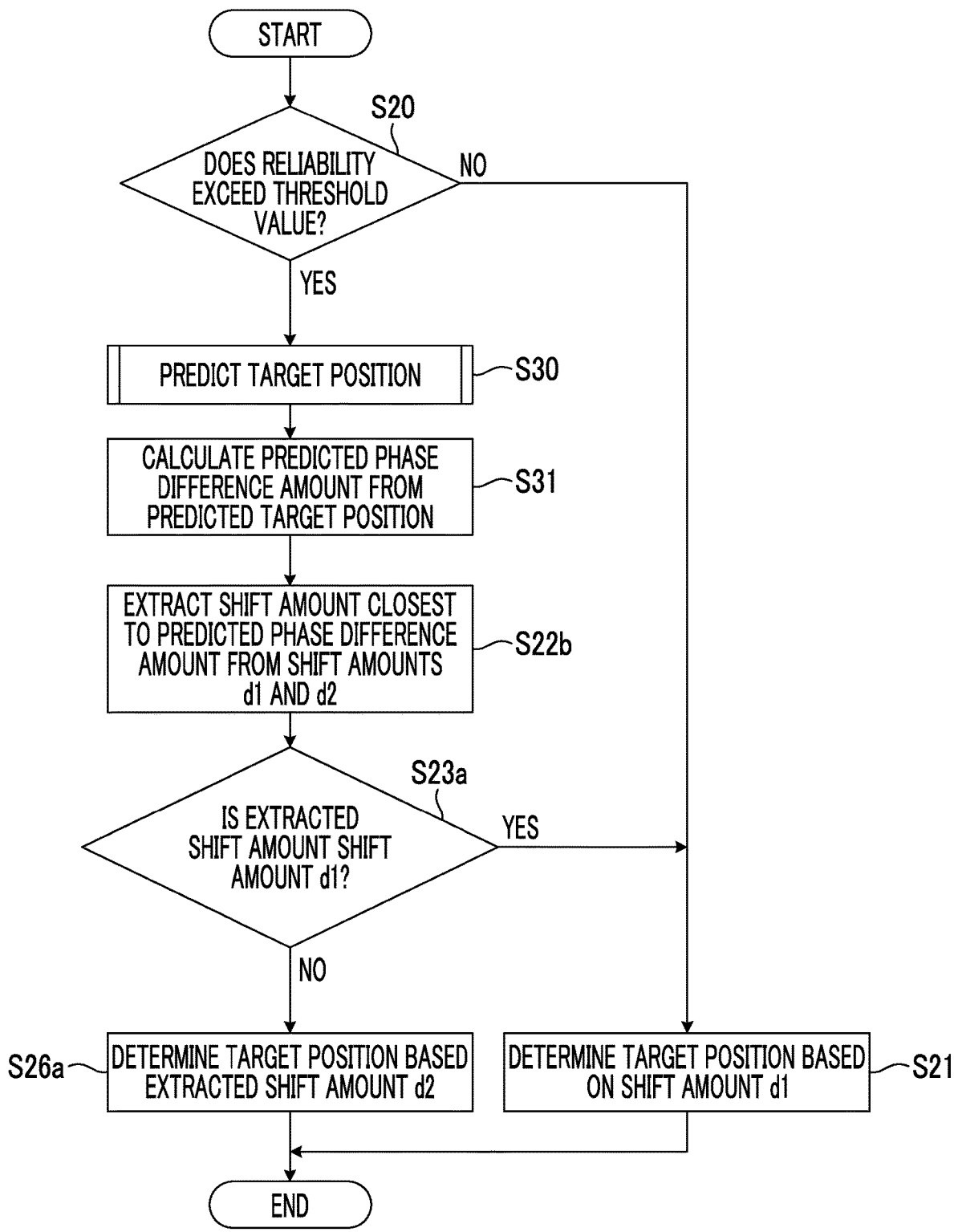

A focusing control operation of the system control unit 11a shown in FIG. 18 is the same as that shown in FIG. 9. A target position determination process (step S10 of FIG. 9) of the focusing control operation will be described with reference to FIG. 19. FIG. 19 is a flowchart for describing the target position determination process by means of the system control unit 11a.

The flowchart shown in FIG. 19 is different from the flowchart of FIG. 14 in that step S22 to step S26 are removed and step S30, step S31, step S22b, step S23a, and step S26a are added instead. In FIG. 19, the same processes as those of FIG. 14 will be assigned the same references, and the description thereof will be omitted.

In a case where the determination result of step S20 is YES, the target position prediction unit 11G predicts the target position of the focus lens at the time of the next AF based on the past target positions of the focus lens determined by the target position determination unit 11E (step S30).

Figure 20:
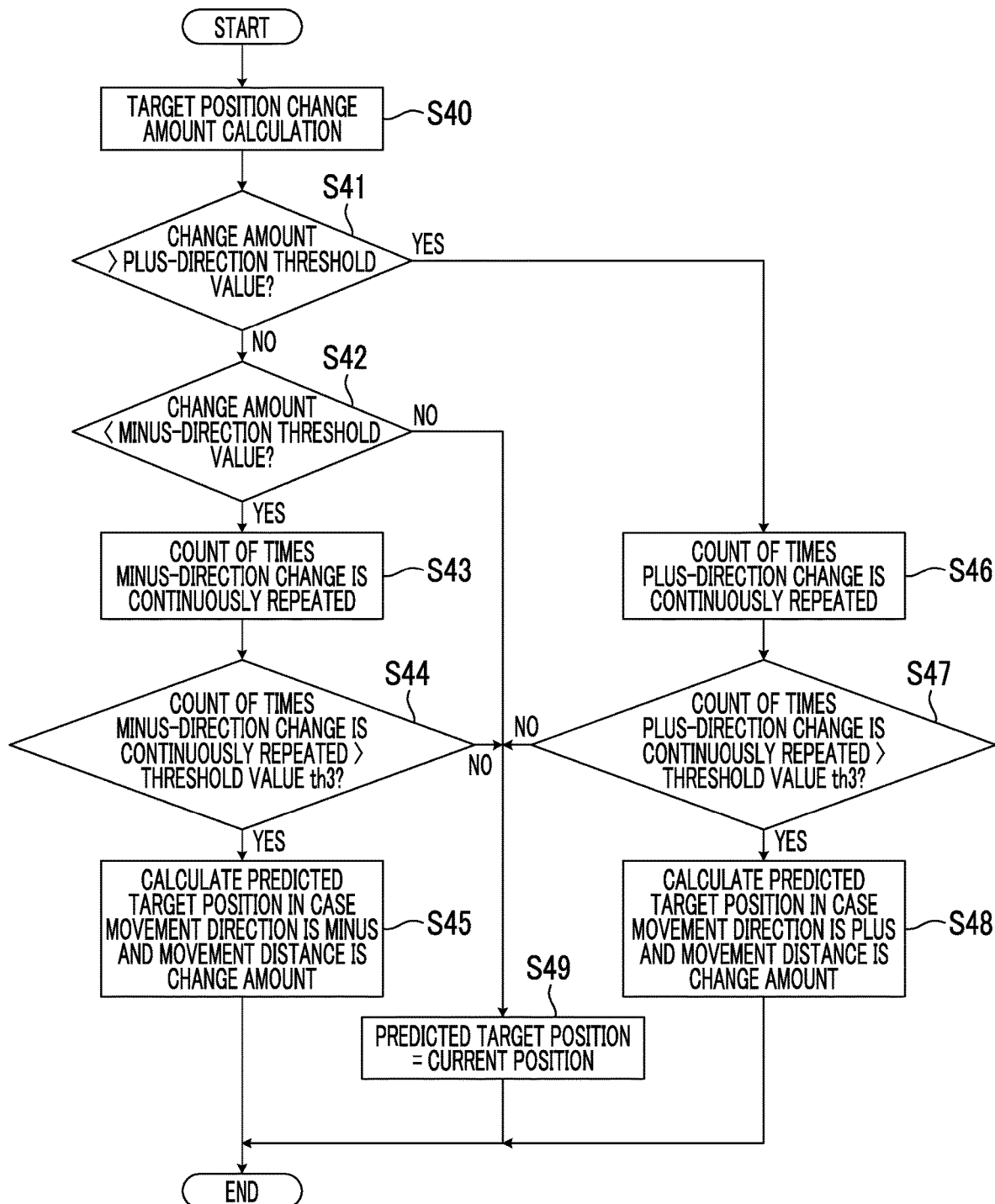
FIG. 20 is a flowchart showing the details of step S30 of FIG. 19.

FIG. 20 is a flowchart showing the details of step S30 of FIG. 19. The movement direction of the focus lens will be described in a case where it is assumed that a direction in which the focus lens faces an end portion of a movable range of the focus lens close to the subject is expressed by a plus and a direction in which the focus lens faces an end portion of the movable range thereof close to the digital camera is expressed by a minus.

The target position prediction unit 11G subtracts a target position determined in a time immediately before a time of the target position from the latest target position of the focus lens determined by the target position determination unit 11E, and calculates a change amount of the target position (step S40).

The change amount means that the target position moves to a position at the time of the previous AF from a position of the AF before the last in a plus direction in a case where the sign is a plus, and means that the target position moves to the position at the time of the previous AF from the position at the time of the AF before the last in a minus direction in a case where the sign is a minus.

The target position prediction unit 11G compares the change amount calculated in step S40 with a plus-direction threshold value (a positive value). In a case where the change amount calculated in step S40 exceeds the plus-direction threshold value (step S41: YES), the target position prediction unit determines that the target position moves in the plus direction, and increases a count value indicating a plus-direction change by one (step S46).

In a case where the count value increased in step S46 exceeds a threshold value th3 (which is a natural number of 1 or greater) (step S47: YES), the target position prediction unit 11G determines a position to which the target position moves from the current focus lens position in the plus direction by an absolute value of the change amount calculated in step S40, as a predicted target position of the focus lens at the time of the next AF (step S48).

In a case where the count value increased in step S46 is equal to or less than the threshold value th3 (step S47: NO), the target position prediction unit 11G outputs a predicted result acquired by determining the predicted target position at the time of the next AF as the current position of the focus lens (step S49).

In a case where the change amount calculated in step S40 is equal to or less than the plus-direction threshold value (step S41: NO), the target position prediction unit 11G compares the change amount calculated in step S40 with a minus-direction threshold value (negative value).

In a case where the change amount calculated in step S40 is equal to or greater than the minus-direction threshold value (step S42: NO), the target position prediction unit 11G performs the process of step S49.

In a case where the change amount calculated in step S40 is less than the minus-direction threshold value (step S42: YES), the target position prediction unit 11G determines that the subject moves in the minus direction, and increases a count value indicating a minus-direction change by one (step S43).

In a case where the count value increased in step S43 exceeds the threshold value th3 (step S44: YES), the target position prediction unit 11G determines a position to which the target position moves from the current focus lens position in the minus direction by an absolute value of the change amount calculated in step S40, as a predicted target position of the focus lens at the time of the next AF (step S45).

In a case where the count value increased in step S44 is equal to or less than the threshold value th3 (step S44: NO), the target position prediction unit 11G performs the process of step S49.

Referring back to FIG. 19, in a case where the predicted target position is acquired in step S30, the phase difference amount prediction unit 11H converts a difference between the predicted target position and the current position of the focus lens into a phase difference amount, and calculates a predicted phase difference amount (step S31).

After step S31, the target position determination unit 11E extracts a shift amount closest to the predicted phase difference amount calculated in step S31 from the shift amount d1 and the shift amounts d2 calculated in the divided areas S53s (step S22b).

Subsequently, the target position determination unit 11E determines whether or not the shift amount extracted in step S22b is the shift amount d1 (step S23a).

In a case where the shift amount extracted in step S22b is the shift amount d1 (step S23a: YES), the target position determination unit 11E performs the process of step S21.

In a case where shift amount extracted in step S22b is not the shift amount d1 and is the shift amount d2 (step S23a: NO), the target position determination unit 11E determines the target position based on the shift amount d2 extracted in step S22b (step S26a).

Specifically, the target position determination unit 11E converts the shift amount d2 extracted in step S22b into a defocus amount, and determines the target position of the focus lens from the defocus amount and the current position of the focus lens.

As stated above, according to the third modification example, in a case where a moving subject is captured, the target position of the focus lens is predicted, and the target position is determined based on the phase difference amount closest to the phase difference amount corresponding to the difference between the predicted target position and the current position of the focus lens. Thus, it is possible to perform the focusing control following the moving subject.

Figure 21:
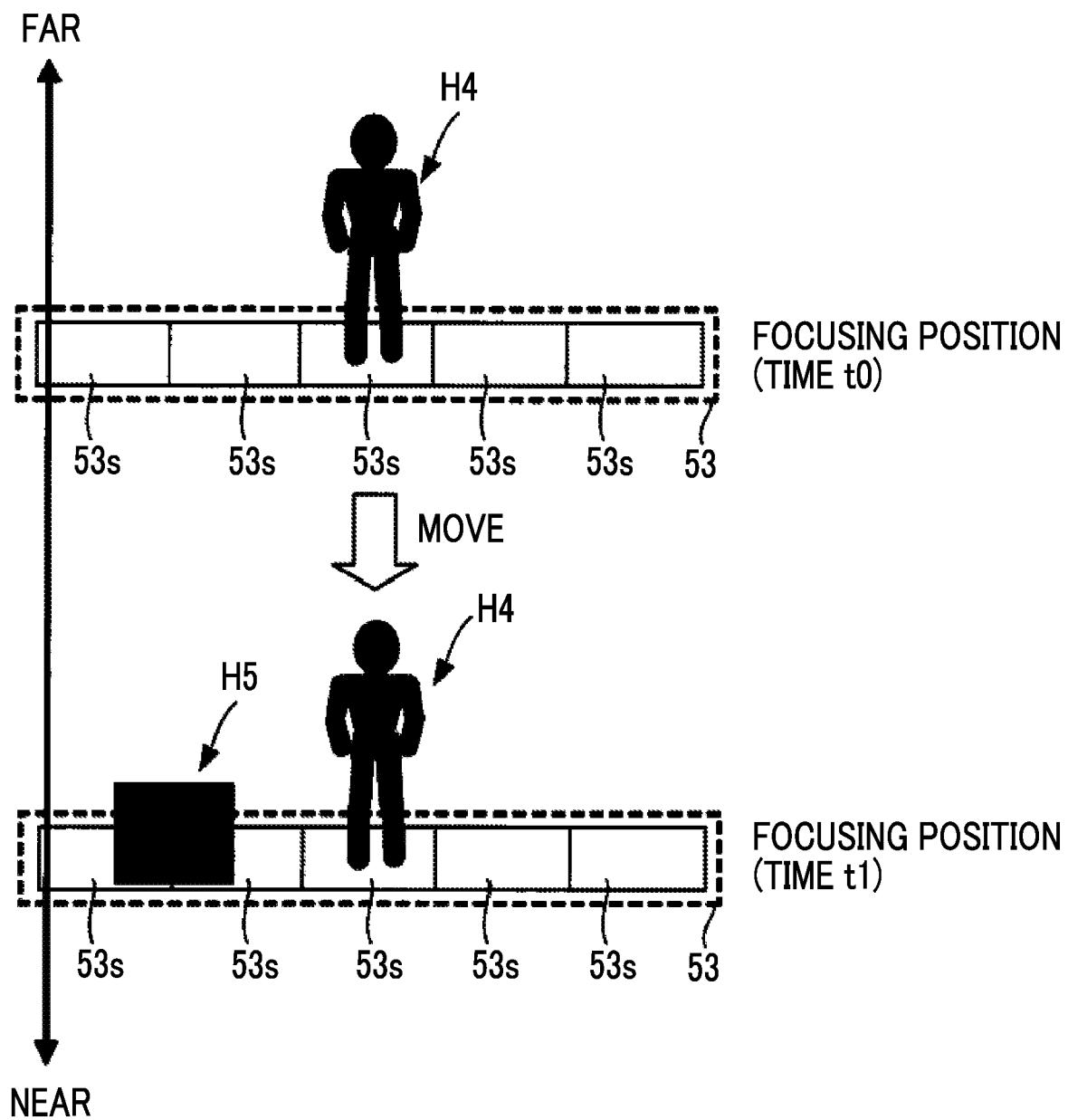
FIG. 21 is a schematic diagram for describing an effect of a third modification example.

For example, a case where a subject H4 approaching the digital camera is captured as a focusing target is considered as shown in FIG. 21. In the example of FIG. 21, a case where a subject H5 is present at the substantially same distance as that of the subject H4 from the digital camera after the subject H4 moves is illustrated.

In the case of FIG. 21, a shift amount (a shift amount d2 measured for the middle divided area 53s in the example of FIG. 21) of the shift amount d1 and the shift amount d2 measured in time t1 which is closest to a phase difference amount predicted based on a predicted movement position of the subject H4 is extracted in step S22b.

Accordingly, it is possible to prevent the subject H5 from being in focus by determining the focusing position in time t1 based on the shift amount d2, and it is possible to continue to focus on the subject H4.

According to the third modification example, it is possible to selectively perform the focusing control using the AF area 53 and the focusing control using the divided areas 53s based on the predicted phase difference amount. Thus, it is possible to perform optimum focusing control depending on an imaging scene, and it is possible to realize high focusing accuracy in various scenes.

Fourth Modification Example

Figure 22:
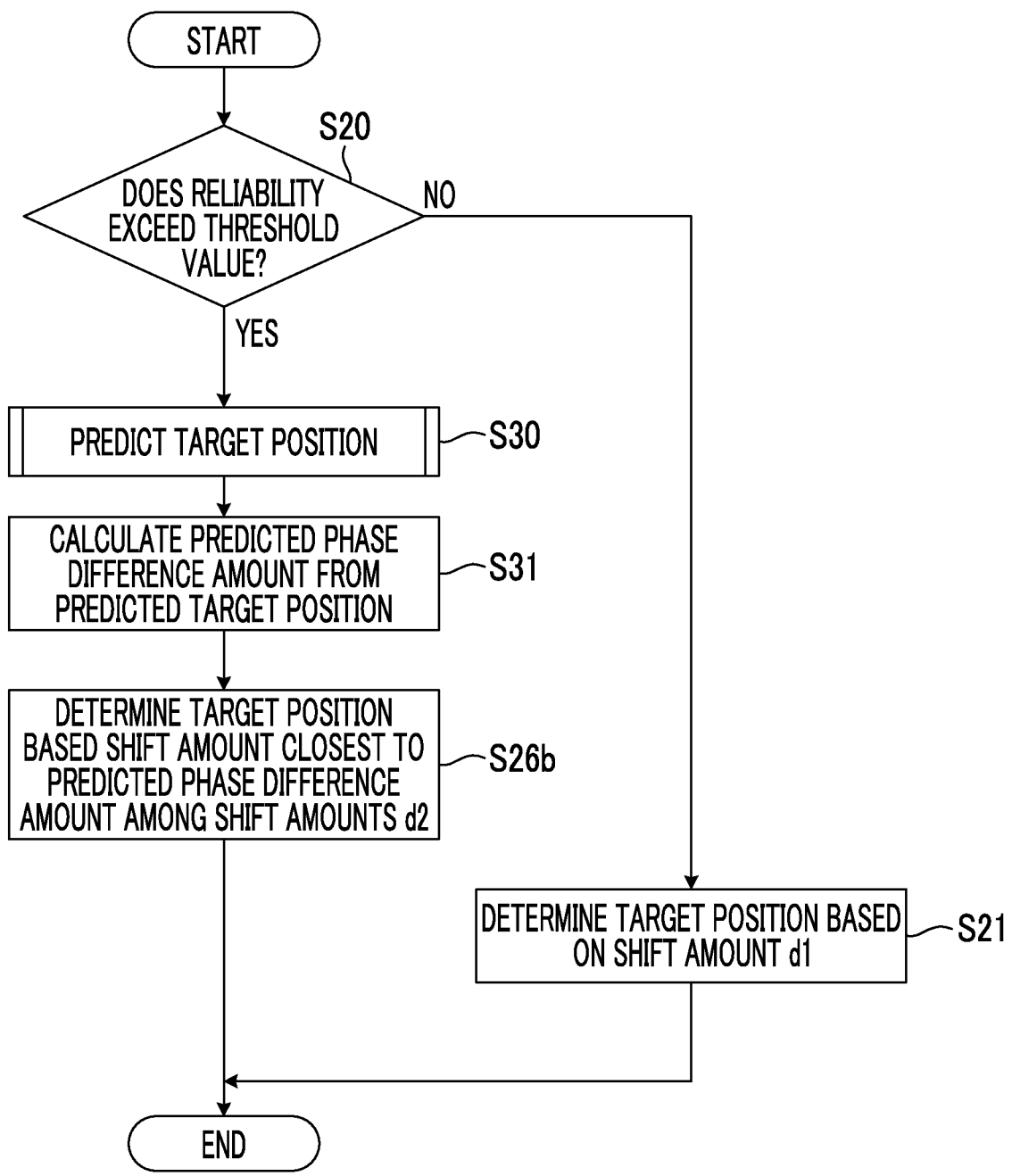
FIG. 22 is a flowchart showing a modification example of the target position determination process in the focusing control operation of the system control unit 11a shown in FIG. 18.

FIG. 22 is a flowchart showing a modification example of the target position determination process in the focusing control operation of the system control unit 11a shown in FIG. 18.

The flowchart shown in FIG. 22 is different from the flowchart shown in FIG. 19 in that step S22b and step S23a are removed and step S26a is changed to step S26b. In FIG. 22, the same processes as those of FIG. 19 will be assigned the same references, and the description thereof will be omitted.

In a case where the predicted phase difference amount is calculated in step S31, the target position determination unit 11E selects the shift amount closest to the predicted phase difference amount among the amounts d2 measured for the divided areas 53s, and determines the target position based on the selected shift amount d2 (step S26b).

Similarly to the third modification example, according to the fourth modification example, it is possible to perform the focusing control following the moving subject with high accuracy.

Fifth Modification Example

A fifth modification example is a combination of the third modification example (FIG. 19) and the first modification example (FIG. 14).

Figure 23:
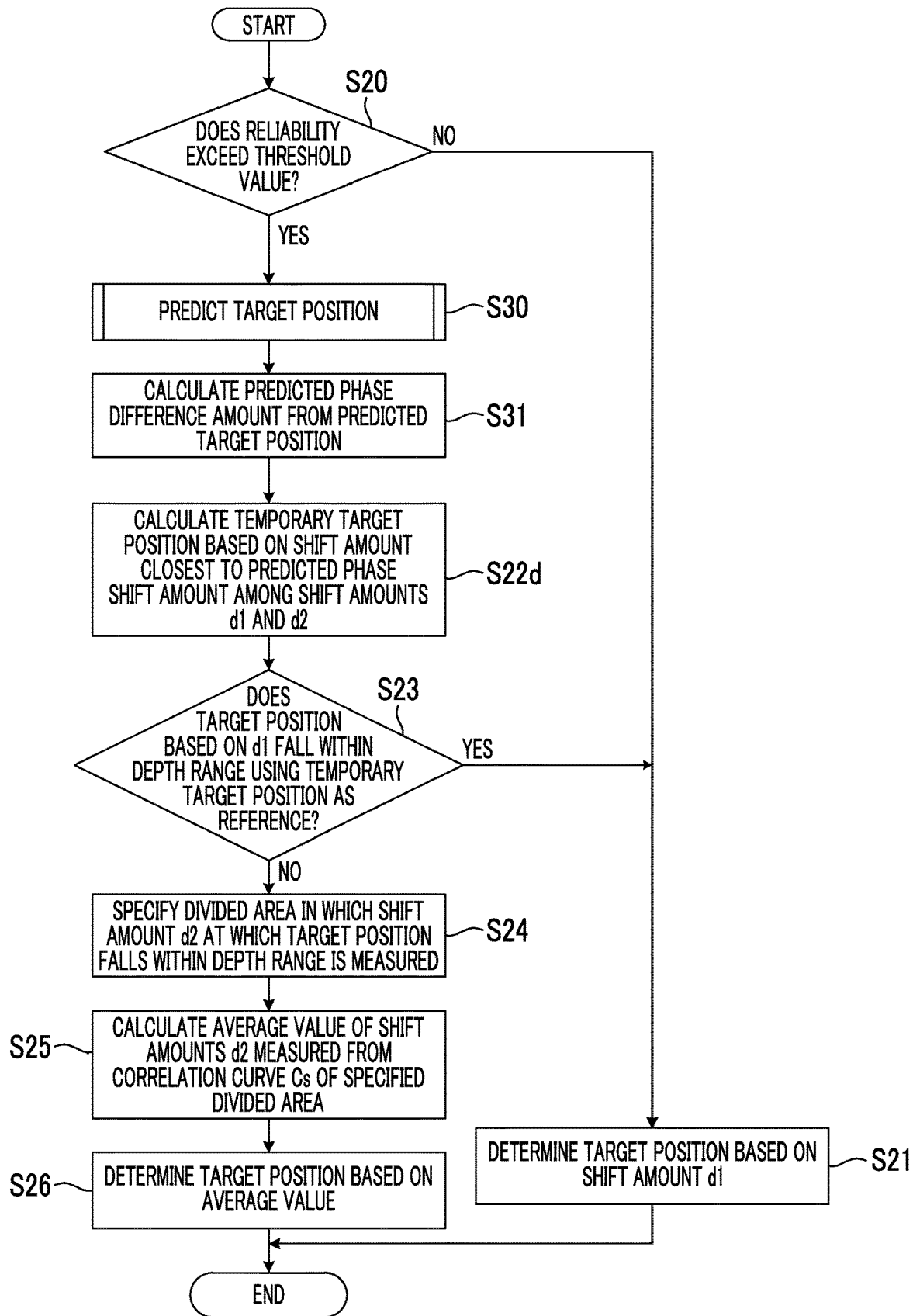
FIG. 23 is a flowchart showing a modification example of the target position determination process in the focusing control operation of the system control unit 11a shown in FIG. 18.

FIG. 23 is a flowchart showing a modification example of the target position determination process in the focusing control operation of the system control unit 11a shown in FIG. 18.

The flowchart shown in FIG. 23 is different from the flowchart shown in FIG. 14 in that step S22 is changed to step S22d and step S30 and step S31 described in FIG. 19 are added between step S22d and step S20. In FIG. 23, the same processes as those of FIGS. 14 and 19 will be assigned the same references, and the description thereof will be omitted.

After step S31, the target position determination unit 11E extracts the shift amount closest to the predicted phase difference amount calculated in step S31 from the shift amount d1 and the shift amounts d2 measured for the divided areas 53s, and calculates the temporary target position of the focus lens based on the extracted shift amount (step S22d).

After step S22d, step S23 and the subsequent processes are performed.

As stated above, according to the fifth modification example, it is possible to acquire an effect of the third modification example of continuing to focus on the moving subject with high accuracy and an effect of the first modification example of focusing on the entire subject which extends diagonally.

Sixth Modification Example

A sixth modification example is a combination of the second modification example (FIG. 17) and the fourth modification example (FIG. 22).

Figure 24:
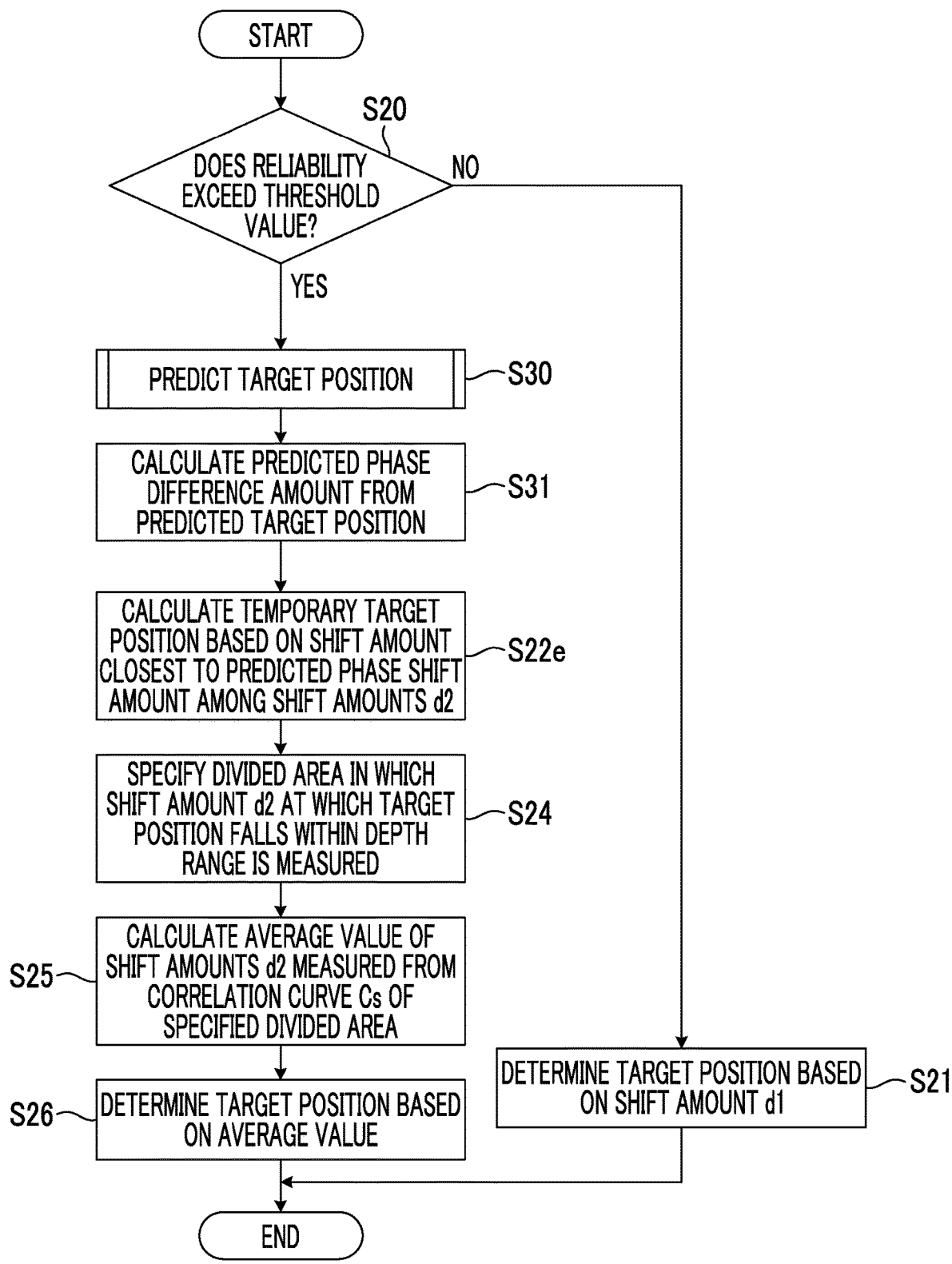
FIG. 24 is a flowchart showing a modification example of the target position determination process in the focusing control operation of the system control unit 11a shown in FIG. 18.

FIG. 24 is a flowchart showing a modification example of the target position determination process in the focusing control operation of the system control unit 11a shown in FIG. 18.

The flowchart shown in FIG. 24 is different from the flowchart shown in FIG. 17 in that step S22a is changed to step S22e and step S30 and step S31 described in FIG. 19 are added between step S22e and step S20. In FIG. 24, the same processes as those of FIGS. 17 and 19 will be assigned the same references, and the description thereof will be omitted.

After step S31, the target position determination unit 11E extracts the shift amount closest to the predicted phase difference amount calculated in step S31 from the shift amounts d2 measured for the divided areas 53s, and calculates the temporary target position of the focus lens based on the extracted shift amount (step S22e).

After step S22e, step S24 and the subsequent processes are performed.

As stated above, according to the sixth modification example, it is possible to acquire an effect of the fourth modification example of continuing to focus on the moving subject with high accuracy and an effect of the second modification example of focusing on the entire subject which diagonally extends.

Seventh Modification Example

Figure 25:
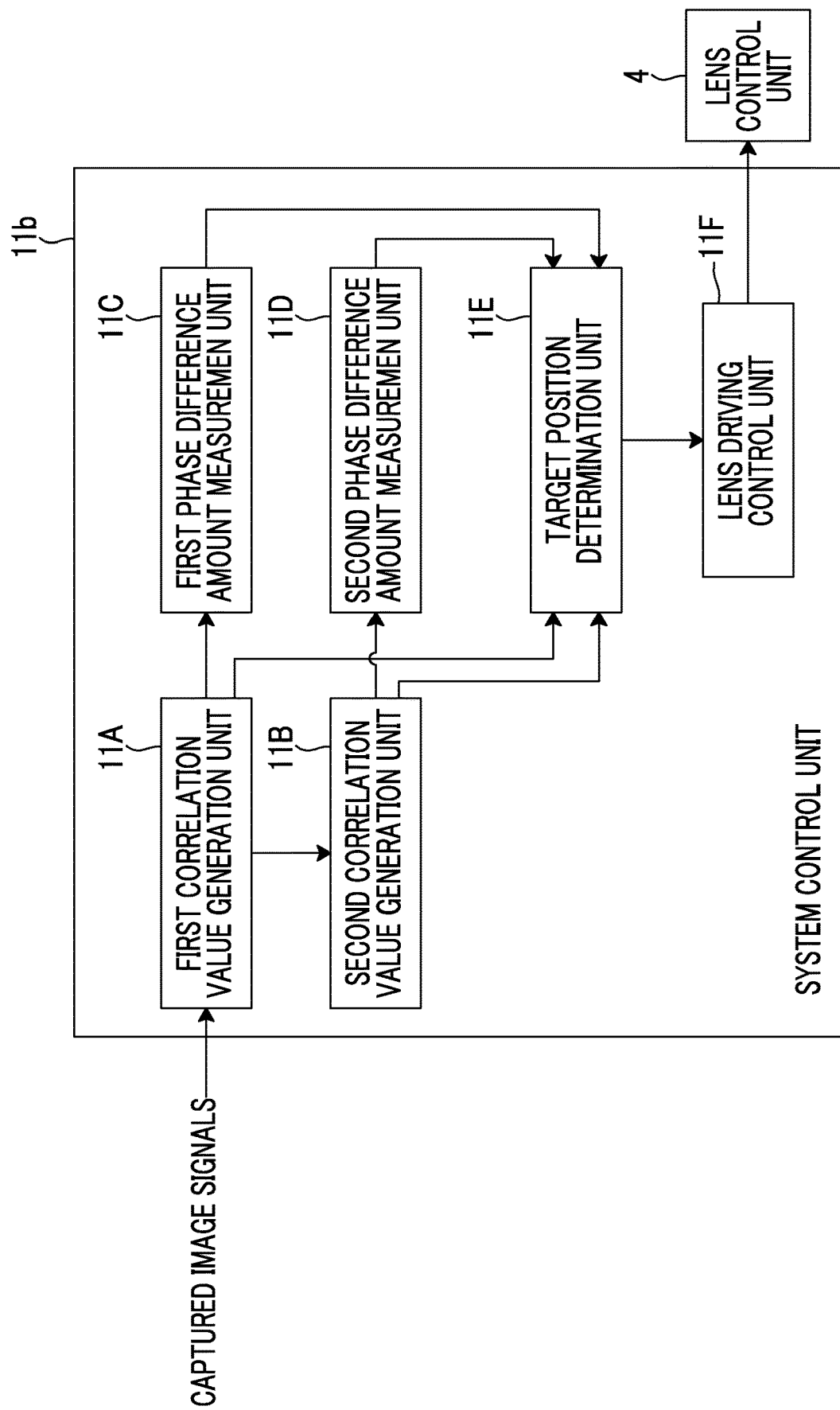
FIG. 25 is a functional block diagram of the system control unit 11b which is a modification example of the system control unit 11.

In a seventh modification example, the system control unit 11 of the digital camera shown in FIG. 1 is changed to a system control unit 11b. FIG. 25 is a functional block diagram of the system control unit 11b. The system control unit 11b has the same configuration as that of the system control unit 11 except that a method of generating the correlation values by means of the second correlation value generation unit 11B is different.

The second correlation value generation unit 11B of the system control unit 11b generates the correlation values for each divided area 53s without performing the correlation calculation by using the calculation result of the correlation values by means of the first correlation value generation unit 11A.

Specifically, the second correlation value generation unit 11B of the system control unit 11b acquires the correlation values between the third signal group and the fourth signal group for an arbitrary divided area 53s by decomposing correlation values between the first signal group and the second signal group generated by the first correlation value generation unit 11A which corresponds to an arbitrary shift amount into components for each divided area 53s and storing an integrated value of the decomposed components in an arbitrary divided area 53s, as a correlation value at an arbitrary shift amount of the arbitrary divided area 53s.

Hereinafter, the method of generating the correlation values by means of the second correlation value generation unit 11B of the system control unit 11b will be described with reference to FIGS. 26 and 27.

Figure 26:
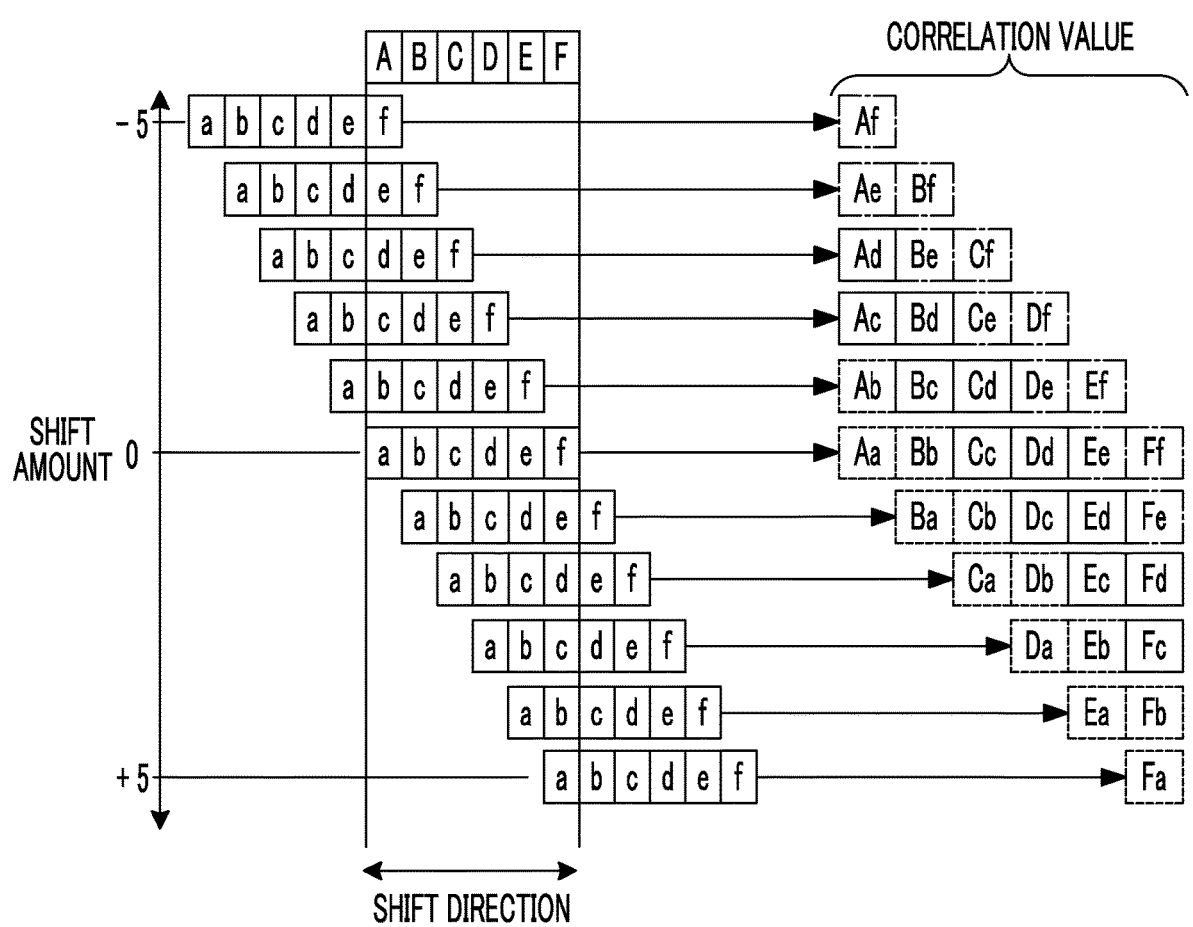
FIG. 26 is a schematic diagram showing the result of correlation calculation of two data strings.

FIG. 26 is a schematic diagram showing the result of correlation calculation of two data strings.

FIG. 26 shows that a data string including data items A to F output from the phase difference detection pixels 52A and a data string including data items a to f output from the phase difference detection pixels 52B.

In FIG. 26, a value which is the square of a difference between data M (M=A, B, C, D, E, and F) and data N (N=a, b, c, d, e, and f) is depicted as a component MN constituting the correlation value. For example, the square of the difference between the data A and the data f is depicted as "Af".

The correlation calculation is a process of shifting the data string including the data items a to f from the data string including the data items A to F in a range of −5 to +5 one by one, calculating the square of the difference between the data items of which the positions in a direction in which the data string is shifted at each shift amount are the same, and acquiring the sum of the calculated square values as the correlation value corresponding to each shift amount.

For example, in the example of FIG. 26, a correlation value in a case where shift amount=−5 is "Af", a correlation value in a case where shift amount=−4 is "Ae"+"Bf", and a correlation value in a case where shift amount=−3 is "Ad"+"Be"+"Cf".

Figure 27:
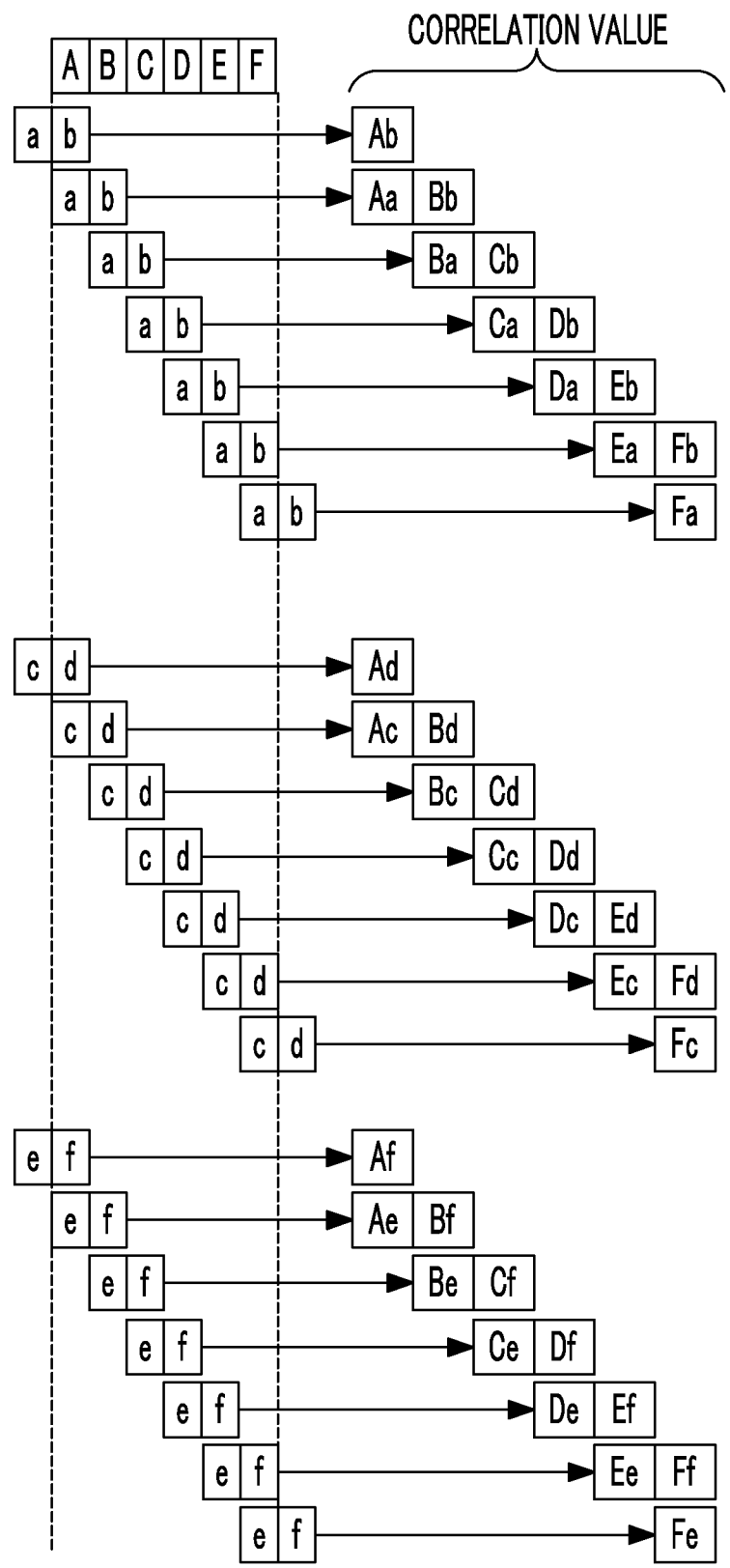
FIG. 27 is a schematic diagram showing the result of the correlation calculation of a data string including data items A to F and divided data strings in a case where a data string including data items a to f shown in FIG. 26 is divided into three.

FIG. 27 is a schematic diagram showing the result of the correlation calculation of the data string including the data items A to F and divided data strings in a case where the data string including the data items a to f shown in FIG. 26 is divided into three. Similarly to FIG. 26, a value which is the square of the difference between the data M (M=A, B, C, D, E, and F) and the data N (N=a, b, c, d, e, and f) is depicted as a component "MN" constituting the correlation value in FIG. 27.

As can be seen from FIGS. 26 and 27, the square value "MN" acquired as the result of the correlation calculation of FIG. 26 is constituted by the square value acquired through the correlation calculation of each divided data string and the data string including the data items A to F.

In FIG. 26, the square value MN acquired through the correlation calculation of the divided data string including the data items a and b and the data string including the data items A and F is depicted as a dashed line block.

In FIG. 26, the square value MN acquired through the correlation calculation of the divided data string including the data items c and d and the data string including the data items A to F is depicted as a solid line block.

In FIG. 26, the square value MN acquired through the correlation calculation of the divided data string including the data items e and f and the data string including the data items A to F is depicted as a dashed dotted line block.

The second correlation value generation unit 11B of the system control unit 11b decomposes the correlation values for the shift amounts acquired as the result acquired by performing the correlation calculation by means of the first correlation value generation unit 11A into components (dashed line blocks in FIG. 26) of the divided data string including the data items a and b, components (solid line blocks in FIG. 26) of the divided data string including the data items c and d, and components (dashed dotted line blocks in FIG. 26) of the divided data string including the data items e and f.

The second correlation value generation unit 11B of the system control unit 11b generates the correlation values between the third signal group and the fourth signal group output from an arbitrary divided area by integrating the square values of the decomposed components of the arbitrary divided data string for the same shift amount and storing the integrated value as the correlation value corresponding to the shift amount.

According to this modification example, since the second correlation value generation unit 11B does not perform the correlation calculation, the second correlation value generation unit reduces a processing amount of the system control unit 11b required for the AF, and thus, it is possible to achieve a decrease in power consumption and an increase in speed of the AF.

The seventh modification example may be a combination of the first modification example to the sixth modification example.

In the digital camera described above, the system control unit 11, the system control unit 11a, and the system control unit 11b constitute the focusing control device. Although it has been described in the digital camera of FIG. 1 that the imaging element 5 for imaging the subject is also used as a sensor for AF, a dedicated sensor different from the imaging element 5 may be included in the digital camera.

Although the digital camera including the focusing control device is used as an example, the invention may be applied to a camera system for broadcasting.

Figure 28:
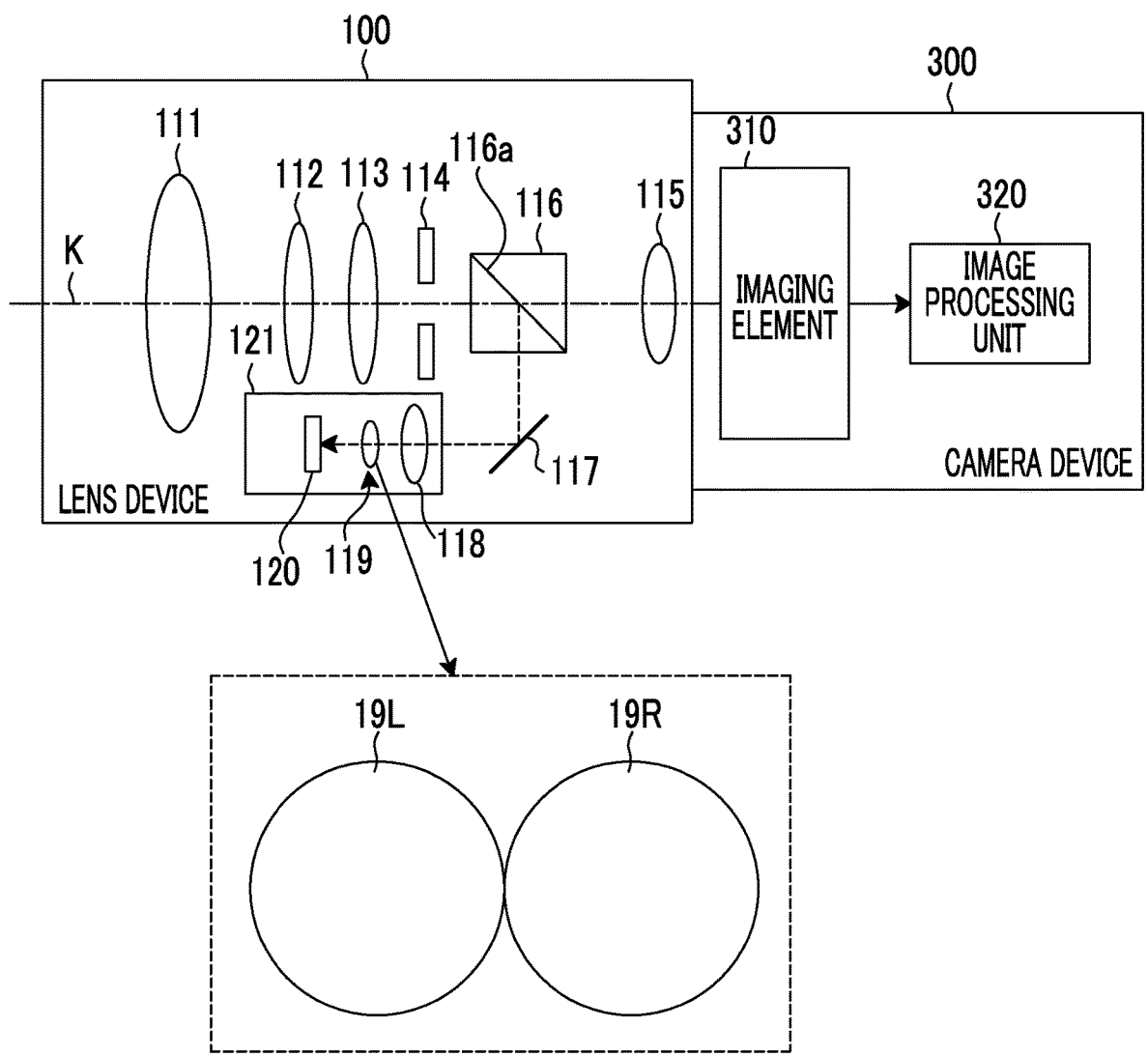
FIG. 28 is a diagram showing the schematic configuration of a camera system for describing an embodiment of the invention.

FIG. 28 is a diagram showing the schematic configuration of a camera system for describing an embodiment of the invention. The camera system is suitable for camera systems for business such as broadcasting or movie.

The camera system shown in FIG. 28 includes a lens device 100 and a camera device 300 as an imaging device to which the lens device 100 is attached.

The lens device 100 includes a focus lens 111, zoom lens 112 and 113, a stop 114, and a master lens group 115, and these lenses are arranged in a line in order from the lens close to the subject.

The focus lens 111, the zoom lenses 112 and 113, the stop 114, and the master lens group 115 constitute the imaging optical system. The imaging optical system includes at least the focus lens 111.

The lens device 100 further includes a beam splitter 116 including a reflection surface 116a, a mirror 117, a condenser lens 118, a separator lens 119, and an AF unit 121 including an imaging element 120. The imaging element 120 is an image sensor such as a CMOS type image sensor or a CCD type image sensor including a plurality of pixels arranged in a two-dimensional shape.

The beam splitter 116 is disposed between the stop 114 and the master lens group 115 on an optical axis K. The beam splitter 116 transmits some (for example, 80% of the subject light rays) of subject light rays which are incident on the imaging optical system and pass through the stop 114, and reflects the remaining light rays (for example, 20% of the subject light rays) acquired by subtracting the some of the subject light rays from the reflection surface 116a in a direction perpendicular to the optical axis K.

The position of the beam splitter 116 is not limited to the position shown in FIG. 28, and the beam splitter may be positioned behind the lens of the imaging optical system closest to the subject on the optical axis K.

The mirror 117 is disposed on an optical path of the light rays reflected from the reflection surface 116a of the beam splitter 116. Thus, the light rays are reflected, and are incident on the condenser lens 118 of the AF unit 121.

The condenser lens 118 concentrates the light rays reflected from the mirror 117.

As shown as an enlarged front view surrounded by a dashed line in FIG. 28, the separator lens 119 is composed of two lenses 19R and 19L arranged in a line in a direction (a horizontal direction in the example of FIG. 28) with an optical axis of the imaging optical system interposed therebetween.

The subject light rays concentrated by the condenser lens 118 pass through the two lenses 19R and 19L, and form images in different positions on a light reception surface (a surface on which a plurality of pixels is formed) of the imaging element 120. That is, a pair of subject light images shifted in one direction and a pair of subject light images shifted in direction perpendicular to the one direction are formed on the light reception surface of the imaging element 120.

The beam splitter 116, the mirror 117, the condenser lens 118, and the separator lens 119 function as an optical element that causes some of the subject light rays incident on the imaging optical system to be incident on an imaging element 310 of the camera device 300 that images the subject light images through the imaging optical system and causes the remaining subject light rays acquired by removing the some of the subject light rays to be incident on the imaging element 120.

The mirror 117 may be removed, and the light rays reflected by the beam splitter 116 may be directly incident on the condenser lens 118.

The imaging element 120 is an area sensor in which a plurality of pixels is arranged on a light reception surface in a two-dimensional shape, and outputs image signals corresponding to the two subject light images formed on the light reception surface. That is, the imaging element 120 outputs a pair of image signals shift in a horizontal direction from one subject light image formed by the imaging optical system.

It is possible to avoid a difficulty in precisely adjusting a position between line sensors by using the area sensor as the imaging element 120 compared to a case where the line sensors are used.

Among the pixels included in the imaging element 120, the pixel that outputs one of the pair of image signals shifted in the horizontal direction constitutes the first signal detection section that receives one luminous flux of the pair of luminous fluxes passing through two different portions arranged in the horizontal direction of the pupil region of the imaging optical system and detects the signal corresponding to the a light reception amount.

Among the pixels included in the imaging element 120, the pixel that outputs the other one of the pair of image signals shifted in the horizontal direction constitutes a second signal detection section that receives the other luminous flux of the pair of luminous fluxes passing through the two different portions arranged in the horizontal direction of the pupil region of the imaging optical system and detects the signal corresponding to the a light reception amount.

Although the area sensor is used as the imaging element 120, a line sensor in which the plurality of pixels constituting the first signal detection section is arranged in the horizontal direction may be disposed in a position facing the lens 19R and a line sensor in which the plurality of pixels constituting the second signal detection section is arranged in the horizontal direction may be disposed in a position facing the lens 19R, instead of the imaging element 120.

The camera device 300 includes the imaging element 310 such as a CCD type image sensor or a CMOS type image sensor disposed on the optical axis K of the lens device 100, and an image processing unit 320 that generates captured image data by processing image signals acquired by imaging the subject light images by the imaging element 310.

The block configuration of the lens device 100 is the same as the lens device of FIG. 1, and includes a drive unit that drives the focus lens and a system control unit that controls the drive unit. The system control unit functions as the aforementioned functional blocks by executing the focusing control program.

However, the first signal group and the second signal group input to the system control unit are signals output from the first signal detection section and the second signal detection section of the imaging element 120. In the camera system, the system control unit of the lens device 100 functions as the focusing control device.

Although it has been described above that the digital camera is used as the imaging device, an embodiment of a smartphone with a camera as the imaging device will be described below.

Figure 29:
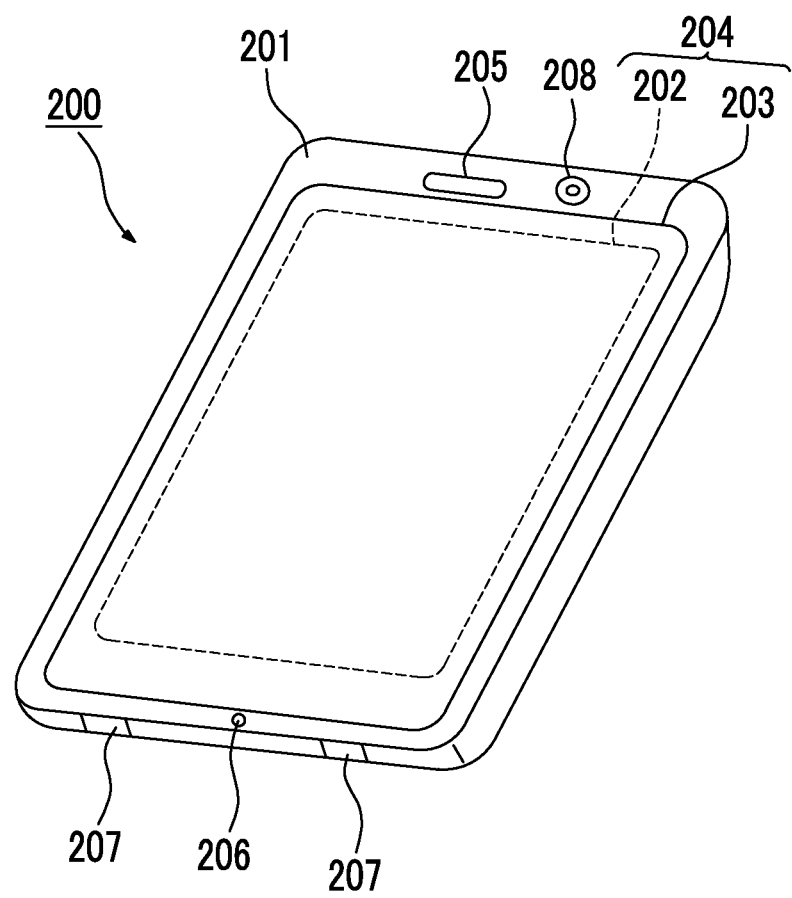
FIG. 29 shows the appearance of a smartphone 200 which is an embodiment of an imaging device of the invention.

FIG. 29 shows the appearance of a smartphone 200 which is an embodiment of an imaging device of the invention. The smartphone 200 shown in FIG. 29 has a flat plate-shaped housing 201, and includes a display input unit 204 in which a display panel 202 as a display unit on one surface of the housing 201 and an operation panel 203 as an input unit are integrated. The housing 201 includes a speaker 205, a microphone 206, an operating unit 207, and a camera unit 208. The configuration of the housing 201 is not limited thereto, and for example, a configuration in which the display unit and the input unit are independent from each other may be employed, or a configuration having a folding structure or a slide mechanism may be employed.

Figure 30:
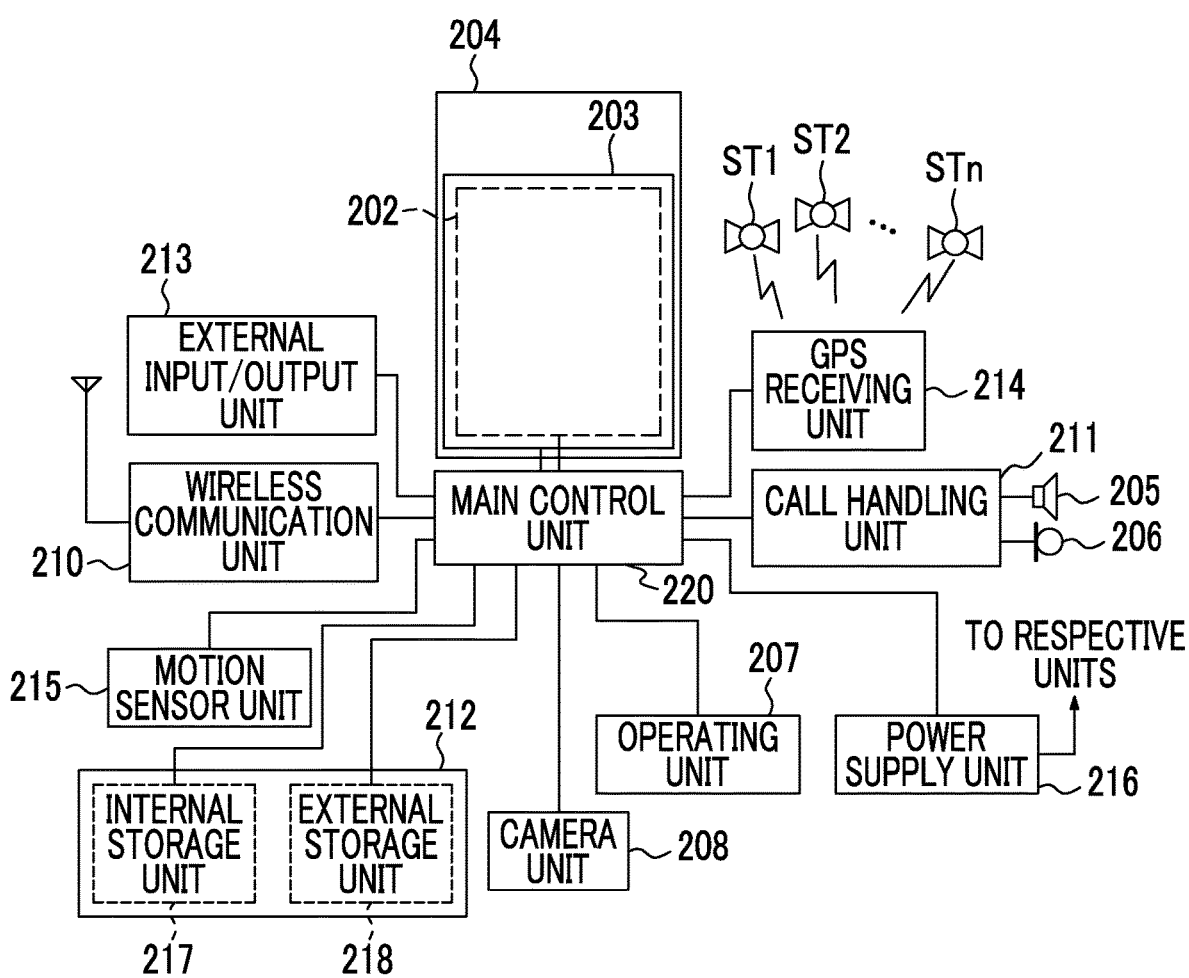
FIG. 30 is a block diagram showing the configuration of the smartphone 200 shown in FIG. 29.

FIG. 30 is a block diagram showing the configuration of the smartphone 200 shown in FIG. 29. As shown in FIG. 30, principal components of the smartphone include a wireless communication unit 210, a display input unit 204, a call handling unit 211, an operating unit 207, a camera unit 208, a storage unit 212, an external input/output unit 213, a global positioning system (GPS) receiving unit 214, a motion sensor unit 215, a power supply unit 216, and a main control unit 220. Principal functions of the smartphone 200 include a wireless communication function of performing mobile wireless communication through a base station device BS (not shown) through a mobile communication network NW (not shown).

The wireless communication unit 210 performs wireless communication with a base station device BS in the mobile communication network NW according to an instruction of the main control unit 220. With the use of the wireless communication, transmission and reception of various kinds of file data, such as voice data and image data, and electronic mail data, or reception of Web data, streaming data, or the like are performed.

The display input unit 204 is a so-called touch panel which displays images (still images and moving images) or character information, or the like to visually transfer information to the user and detects a user's operation on the displayed information under the control of the main control unit 220, and includes the display panel 202 and the operation panel 203.

The display panel 202 uses a liquid crystal display (LCD), an organic electro-luminescence display (OELD), or the like as a display device.

The operation panel 203 is a device which is placed such that an image displayed on a display surface of the display panel 202 is visible, and detects one or a plurality of coordinates of an operation with a user's finger or a stylus. If the device is operated with the user's finger or the stylus, a detection signal due to the operation is output to the main control unit 220. Next, the main control unit 220 detects an operation position (coordinates) on the display panel 202 based on the received detection signal.

As shown in FIG. 29, although the display panel 202 and the operation panel 203 of the smartphone 200 illustrated as an embodiment of an imaging device of the invention are integrated to constitute the display input unit 204, the operation panel 203 is arranged to completely cover the display panel 202.

In a case where this arrangement is employed, the operation panel 203 may include a function of detecting a user's operation even in a region outside the display panel 202. In other words, the operation panel 203 may include a detection region (hereinafter, referred to as a display region) for a superimposed portion overlapping the display panel 202 and a detection region (hereinafter, referred to as a non-display region) for an outer edge portion not overlapping the display panel 202 other than the display region.

Although the size of the display region may completely match the size of the display panel 202, it is not necessary to match both of the size of the display region and the size of the display panel. The operation panel 203 may include two sensitive regions including an outer edge portion and an inner portion other than the outer edge portion. The width of the outer edge portion is appropriately designed according to the size of the housing 201 or the like. As a position detection system which is employed in the operation panel 203, a matrix switching system, a resistive film system, a surface acoustic wave system, an infrared system, an electromagnetic induction system, an electrostatic capacitance system, and the like are exemplified, and any system can be employed.

The call handling unit 211 includes the speaker 205 and the microphone 206, converts voice of the user input through the microphone 206 to voice data processable in the main control unit 220 and outputs voice data to the main control unit 220, or decodes voice data received by the wireless communication unit 210 or the external input/output unit 213 and outputs voice from the speaker 205. As shown in FIG. 28, for example, the speaker 205 can be mounted on the same surface as the surface on which the display input unit 204 is provided, and the microphone 206 can be mounted on the side surface of the housing 201.

The operating unit 207 is a hardware key using a key switch or the like, and receives an instruction from the user. For example, as shown in FIG. 29, the operating unit 207 is a push button-type switch which is mounted on the side surface of the housing 201 of the smartphone 200, and is turned on by being depressed with a finger or the like and is turned off by restoration force of the panel or the like in a case where the finger is released.

The storage unit 212 stores a control program or control data of the main control unit 220, application software, address data in association with the name, telephone number, and the like of a communication partner, data of transmitted and received electronic mail, Web data downloaded by Web browsing, and downloaded content data, and temporarily stores streaming data or the like. The storage unit 212 is constituted of an internal storage unit 217 embedded in the smartphone and an external storage unit 218 having a slot for a detachable external memory. The internal storage unit 217 and the external storage unit 218 constituting the storage unit 212 are realized using a memory (for example, a microSD (Registered Trademark) memory or the like), such as a flash memory type, a hard disk type, a multimedia card micro type, or a card type, or a storage medium, such as a random access memory (RAM) or a read only memory (ROM).

The external input/output unit 213 plays a role of an interface with all external devices connected to the smartphone 200, and is provided for direct or indirect connection to other external devices through communication or the like (for example, universal serial bus (USB), IEEE 1394, or the like), or a network (for example, the Internet, wireless LAN, Bluetooth (Registered trademark), radio frequency identification (RFID), infrared communication (infrared data association: IrDA (Registered Trademark), ultra wideband (UWB) (Registered Trademark), ZigBee (Registered Trademark), or the like).

The external devices connected to the smartphone 200 are, for example, a wired or wireless headset, a wired or wireless external charger, a wired or wireless data port, a memory card connected through a card socket, a subscriber identity module (SIM) card, a user identity module (UIM) card, an external audio-video device connected through an audio-video input/output (I/O) terminal, an external audio-video device connected in a wireless manner, a smartphone connected in a wired or wireless manner, a personal computer connected in a wired or wireless manner, a PDA connected in a wired or wireless manner, an earphone connected in a wired or wireless manner, and the like. The external input/output unit 213 can transfer data transmitted from the external devices to the respective components in the smartphone 200 or can transmit data in the smartphone 200 to the external devices.

The GPS receiving unit 214 receives GPS signals transmitted from GPS satellites ST1 to STn according to an instruction of the main control unit 220, executes positioning calculation processing based on a plurality of received GPS signals, and detects the position of the smartphone 200 having latitude, longitude, and altitude. In a case where positional information can be acquired from the wireless communication unit 210 or the external input/output unit 213 (for example, a wireless LAN), the GPS receiving unit 214 can detect the position using the positional information.

The motion sensor unit 215 includes, for example, a three-axis acceleration sensor or the like, and detects physical motion of the smartphone 200 according to an instruction of the main control unit 220. The moving direction or acceleration of the smartphone 200 is detected by detecting physical motion of the smartphone 200. The detection result is output to the main control unit 220.

The power supply unit 216 supplies electric power stored in a battery (not shown) to the respective units of the smartphone 200 according to an instruction of the main control unit 220.

The main control unit 220 includes a microprocessor, operates according to the control program or control data stored in the storage unit 212, and integrally controls the respective units of the smartphone 200. The main control unit 220 has a mobile communication control function of controlling respective units of a communication system in order to perform voice communication or data communication through the wireless communication unit 210, and an application processing function.

The application processing function is realized by the main control unit 220 operating according to application software stored in the storage unit 212. The application processing function is, for example, an infrared communication function of controlling the external input/output unit 213 to perform data communication with a device facing the smartphone 200, an electronic mail function of transmitting and receiving electronic mail, a Web browsing function of browsing Web pages, or the like.

The main control unit 220 has an image processing function of displaying video on the display input unit 204, or the like based on image data (still image or moving image data), such as received data or downloaded streaming data. The image processing function refers to a function of the main control unit 220 decoding image data, performing image processing on the decoding result, and displaying an image on the display input unit 204.

The main control unit 220 executes display control on the display panel 202 and operation detection control for detecting a user's operation through the operating unit 207 and the operation panel 203. With the execution of the display control, the main control unit 220 displays an icon for activating application software or a software key, such as a scroll bar, or displays a window for creating electronic mail. The scroll bar refers to a software key for receiving an instruction to move a display portion of an image which is too large to fit into the display region of the display panel 202.

With the execution of the operation detection control, the main control unit 220 detects a user's operation through the operating unit 207, receives an operation on the icon or an input of a character string in an entry column of the window through the operation panel 203, or receives a scroll request of a display image through the scroll bar.

In addition, with the execution of the operation detection control, the main control unit 220 has a touch panel control function of determining whether an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main control unit 220 may detect a gesture operation on the operation panel 203 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 208 includes the configuration other than the external memory control unit 20, the recording medium 21, the display control unit 22, the display unit 23, and the operating unit 14 in the digital camera shown in FIG. 1.

Captured image data generated by the camera unit 208 can be recorded in the storage unit 212 or can be output through the external input/output unit 213 or the wireless communication unit 210.

In the smartphone 200 shown in FIG. 29, although the camera unit 208 is mounted on the same surface as the display input unit 204, the mounting position of the camera unit 208 is not limited thereto, and the camera unit 208 may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS receiving unit 214 detects the position, the position may be detected with reference to an image from the camera unit 208. In addition, the optical axis direction of the camera unit 208 of the smartphone 200 can be determined or a current use environment may be determined with reference to an image from the camera unit 208 without using the three-axis acceleration sensor or in combination with the three-axis acceleration sensor. Of course, an image from the camera unit 208 may be used in application software.

In addition, image data of a still image or a moving image may be attached with positional information acquired by the GPS receiving unit 214, voice information (which may be converted to text information through voice-text conversion by the main control unit or the like) acquired by the microphone 206, posture information acquired by the motion sensor unit 215, or the like and can be recorded in the storage unit 212, or may be output through the external input/output unit 213 or the wireless communication unit 210.

As stated above, the following matters are disclosed in this specification.

Disclosed is a focusing control device comprising a sensor that has a focus detection area in which a plurality of first signal detection sections which receives one of a pair of luminous fluxes passing through different portions arranged in one direction of a pupil region of an imaging optical system including a focus lens and detects signals corresponding to light reception amounts and a plurality of second signal detection sections which receives the other one of the pair of luminous fluxes and detects signals corresponding to light reception amounts are formed, a first correlation value generation unit that acquires correlation values between a first signal group output from the plurality of first signal detection sections of the focus detection area and a second signal group output from the plurality of second signal detection sections of the focus detection area, a second correlation value generation unit that performs a process of acquiring correlation values between a third signal group output from the plurality of first signal detection sections included in each of divided areas in a state in which the focus detection area is divided in the one direction and a fourth signal group output from the plurality of second signal detection sections included in the divided area, for each divided area, a first phase difference amount measurement unit that measures a first phase difference amount between the first signal group and the second signal group from the correlation values acquired by the first correlation value generation unit, a second phase difference amount measurement unit that measures a second phase difference amount between the third signal group and the fourth signal group for each divided area from the correlation values acquired by the second correlation value generation unit, a target position determination unit that selectively performs a first process of determining a target position of the focus lens based on the first phase difference amount and a second process of determining the target position of the focus lens based on the second phase difference amount, based on the correlation values acquired by the first correlation value generation unit and the correlation values acquired by the second correlation value generation unit, and a lens driving control unit that drives the focus lens to the target position determined through the first process or the second process.

In the disclosed focusing control device, the target position determination unit determines reliability of the target position determined through the second process based on the correlation values acquired by the first correlation value generation unit and the correlation values acquired by the second correlation value generation unit, performs the first process in a case where the reliability is equal to or less than a threshold value, and performs any one of the first process and the second process in a case where the reliability exceeds the threshold value.

In the disclosed focusing control device, the target position determination unit measures a first shift amount between the first signal group and the second signal group in a state in which the correlation value between the first signal group and the second signal group is minimum from the correlation values acquired by the first correlation value generation unit, measures a second shift amount between the third signal group and the fourth signal group in a case where a first correlation value which is a minimum value of the correlation values between the third signal group and the fourth signal group calculated in at least a partial range of a range in which a shift amount between the third signal group and the fourth signal group is able to be acquired is acquired from the correlation values acquired by the second correlation value generation unit, and determines that reliability of the target position determined through the second process exceeds the threshold value in a case where the divided area in which a difference between the first shift amount and the second shift amount is equal to or less than a shift amount threshold value is present.

In the disclosed focusing control device, the target position determination unit determines that the reliability of the target position determined through the second process exceeds the threshold value in a case where the divided area in which a difference between the first correlation values and the second correlation values between the third signal group and the fourth signal group in a case where the shift amount between the third signal group and the fourth signal group is the first shift amount is equal to or greater than a correlation threshold value and the difference between of the first shift amount and the second shift amount exceeds the shift amount threshold value is present.

In the disclosed focusing control device, the target position determination unit detects the first correlation value by using a partial range of the range in which the shift amount between the third signal group and the fourth signal group is able to be acquired as a target, and the partial range is a predetermined range including zero as the shift amount between the third signal group and the fourth signal group.

In the disclosed focusing control device, the target position determination unit calculates a temporary target position of the focus lens based on a minimum phase difference amount of the first phase difference amount and the plurality of second phase difference amounts in a case where the reliability exceeds the threshold value, determines whether or not the target position of the focus lens based on the first phase difference amount falls within a predetermined depth range using the temporary target position in a movement direction of the focus lens as a reference, performs the first process in a case where the target position of the focus lens based on the first phase difference amount falls within the depth range, and performs the second process in a case where the target position of the focus lens based on the first phase difference amount is out of the depth range. In the second process, the target position of the focus lens is determined based on an average value of the second phase difference amounts measured for the divided areas in which the target position of the focus lens based on the second phase difference amounts falls within the depth range.

In the disclosed focusing control device, the target position determination unit performs the second process in a case where the reliability exceeds the threshold value. In the second process, a temporary target position of the focus lens is calculated based on a minimum phase difference amount of the plurality of second phase difference amounts, the divided areas in which the target position of the focus lens based on the second phase difference amounts falls within a predetermined depth range using the temporary target position in a movement direction of the focus lens as a reference is specified, and the target position of the focus lens is determined based on an average value of the second phase difference amounts measured for the specified divided areas.

The disclosed focusing control device further comprises a target position prediction unit that predicts the target position of the focus lens based on a target position history of the focus lens determined by the target position determination unit, and a phase difference amount prediction unit that converts a difference between the target position predicted by the target position prediction unit and a position of the focus lens into a phase difference amount to predict the phase difference amount. The target position determination unit extracts a phase difference amount closest to the phase difference amount predicted by the phase difference amount prediction unit from the first phase difference amount and the plurality of second phase difference amounts in a case where the reliability exceeds the threshold value, calculates a temporary target position of the focus lens based on the extracted phase difference amount, determines whether or not the target position of the focus lens based on the first phase difference amount falls within a predetermined depth range using the temporary target position in a movement direction of the focus lens as a reference, performs the first process in a case where the target position of the focus lens based on the first phase difference amount falls within the depth range, and performs the second process in a case where the target position of the focus lens based on the first phase difference amount is out of the depth range. In the second process, the target position of the focus lens is determined based on an average value of the second phase difference amounts measured for the divided areas in which the target position of the focus lens based on the second phase difference amounts falls within the depth range.

The disclosed focusing control device further comprises a target position prediction unit that predicts the target position of the focus lens based on a target position history of the focus lens determined by the target position determination unit, and a phase difference amount prediction unit that converts a difference between the target position predicted by the target position prediction unit and a position of the focus lens into a phase difference amount to predict the phase difference amount. The target position determination unit extracts a phase difference amount closest to the phase difference amount predicted by the phase difference amount prediction unit from the first phase difference amount and the plurality of second phase difference amounts in a case where the reliability exceeds the threshold value, performs the first process in a case where the extracted phase difference amount is the first phase difference amount, and performs the second process in a case where the extracted phase difference amount is the second phase difference amount. In the second process, the target position of the focus lens is determined based on the extracted second phase difference amount.

The disclosed focusing control device further comprises a target position prediction unit that predicts the target position of the focus lens based on a target position history of the focus lens determined by the target position determination unit, and a phase difference amount prediction unit that converts a difference between the target position predicted by the target position prediction unit and a position of the focus lens into a phase difference amount to predict the phase difference amount. The target position determination unit performs the second process in a case where the reliability exceeds the threshold value. In the second process, a phase difference amount closest to the phase difference amount predicted by the phase difference amount prediction unit is extracted from the plurality of second phase difference amounts, and the target position of the focus lens is determined based on the extracted second phase difference amount.

In the disclosed focusing control device, the second correlation value generation unit acquires the correlation values between the third signal group and the fourth signal group for an arbitrary divided area by decomposing the correlation values between the first signal group and the second signal group generated by the first correlation value generation unit into components of the correlation values for each divided area and storing an integrated value of the decomposed components between the first signal group and the second signal group corresponding to an arbitrary shift amount in the arbitrary divided area, as a correlation value at the arbitrary shift amount in the arbitrary divided area.

Disclosed is a lens device comprising the focusing control device, and an imaging optical system including a focus lens for causing light to be incident on the sensor.

Disclosed is an imaging device comprising the focusing control device.

Disclosed is a focusing control method comprising a first correlation value generation step of acquiring correlation values between a first signal group output from a plurality of first signal detection sections of a focus detection area of a sensor and a second signal group output from a plurality of second signal detection sections of the focus detection area, the plurality of first signal detection sections which receives one of a pair of luminous fluxes passing through different portions arranged in one direction of a pupil region of an imaging optical system including a focus lens and detects signals corresponding to light reception amounts and the plurality of second signal detection sections which receives the other one of the pair of luminous fluxes and detects signals corresponding to light reception amounts being formed in the focus detection area, a second correlation value generation step of performing a process of acquiring correlation values between a third signal group output from the plurality of first signal detection sections included in each of divided areas in a state in which the focus detection area is divided in the one direction and a fourth signal group output from the plurality of second signal detection sections included in the divided area, for each divided area, a first phase difference amount measurement step of measuring a first phase difference amount between the first signal group and the second signal group from the correlation values acquired in the first correlation value generation step, a second phase difference amount measurement step of measuring a second phase difference amount between the third signal group and the fourth signal group for each divided area from the correlation values acquired in the second correlation value generation step, a target position determination step of selectively performing a first process of determining a target position of the focus lens based on the first phase difference amount and a second process of determining the target position of the focus lens based on the second phase difference amount, based on the correlation values acquired in the first correlation value generation step and the correlation values acquired in the second correlation value generation step, and a lens driving control step of driving the focus lens to the target position determined through the first process or the second process.

In the disclosed focusing control method, in the target position determination step, reliability of the target position determined through the second process is determined based on the correlation values acquired in the first correlation value generation step and the correlation values acquired in the second correlation value generation step, the first process is performed in a case where the reliability is equal to or less than a threshold value, and any one of the first process and the second process is performed in a case where the reliability exceeds the threshold value.

In the disclosed focusing control method, in the target position determination step, a first shift amount between the first signal group and the second signal group in a state in which the correlation value between the first signal group and the second signal group is minimum is measured from the correlation values acquired in the first correlation value generation step, a second shift amount between the third signal group and the fourth signal group in a case where a first correlation value which is a minimum value of the correlation values between the third signal group and the fourth signal group calculated in at least a partial range of a range in which a shift amount between the third signal group and the fourth signal group is able to be acquired is acquired is measured from the correlation values acquired in the second correlation value generation step, and reliability of the target position determined through the second process is determined to exceed the threshold value in a case where the divided area in which a difference between the first shift amount and the second shift amount is equal to or less than a shift amount threshold value is present.

In the disclosed focusing control method, in the target position determination step, the reliability of the target position determined through the second process is determined to exceed the threshold value in a case where the divided area in which a difference between the first correlation values and the second correlation values between the third signal group and the fourth signal group in a case where the shift amount between the third signal group and the fourth signal group is the first shift amount is equal to or greater than a correlation threshold value and the difference between of the first shift amount and the second shift amount exceeds the shift amount threshold value is present.

In the disclosed focusing control method, in the target position determination step, the first correlation value by using a partial range of the range in which the shift amount between the third signal group and the fourth signal group is able to be acquired is measured as a target, and the partial range is a predetermined range including zero as the shift amount between the third signal group and the fourth signal group.

In the disclosed focusing control method, in the target position determination step, a temporary target position of the focus lens is calculated based on a minimum phase difference amount of the first phase difference amount and the plurality of second phase difference amounts in a case where the reliability exceeds the threshold value, whether or not the target position of the focus lens based on the first phase difference amount falls within a predetermined depth range using the temporary target position in a movement direction of the focus lens as a reference is determined, the first process is performed in a case where the target position of the focus lens based on the first phase difference amount falls within the depth range, and the second process is performed in a case where the target position of the focus lens based on the first phase difference amount is out of the depth range, and in the second process, the target position of the focus lens is determined based on an average value of the second phase difference amounts measured for the divided areas in which the target position of the focus lens based on the second phase difference amounts falls within the depth range in the target position determination step.

In the disclosed focusing control method, in the target position determination step, the second process is performed in a case where the reliability exceeds the threshold value, and in the second process, a temporary target position of the focus lens is calculated based on a minimum phase difference amount of the plurality of second phase difference amounts, the divided areas in which the target position of the focus lens based on the second phase difference amounts falls within a predetermined depth range using the temporary target position in a movement direction of the focus lens as a reference are specified, and the target position of the focus lens is determined based on an average value of the second phase difference amounts measured for the specified divided areas.

The disclosed focusing control method further comprises a target position prediction step of predicting the target position of the focus lens based on a target position history of the focus lens determined in the target position determination step, and a phase difference amount prediction step of converting a difference between the target position predicted in the target position prediction step and a position of the focus lens into a phase difference amount, and predicting the phase difference amount. In the target position determination step, a phase difference amount closest to the phase difference amount predicted in the phase difference amount prediction step is extracted from the first phase difference amount and the plurality of second phase difference amounts in a case where the reliability exceeds the threshold value, a temporary target position of the focus lens is calculated based on the extracted phase difference amount, whether or not the target position of the focus lens based on the first phase difference amount falls within a predetermined depth range using the temporary target position in a movement direction of the focus lens as a reference is determined, the first process is performed in a case where the target position of the focus lens based on the first phase difference amount falls within the depth range, and the second process is performed in a case where the target position of the focus lens based on the first phase difference amount is out of the depth range. In the second process, the target position of the focus lens is determined based on an average value of the second phase difference amounts measured for the divided areas in which the target position of the focus lens based on the second phase difference amounts falls within the depth range.

The disclosed focusing control method further comprises a target position prediction step of predicting the target position of the focus lens based on a target position history of the focus lens determined in the target position determination step, and a phase difference amount prediction step of converting a difference between the target position predicted in the target position prediction step and a position of the focus lens into a phase difference amount, and predicting the phase difference amount. In the target position determination step, a phase difference amount closest to the phase difference amount predicted in the phase difference amount prediction step is extracted from the first phase difference amount and the plurality of second phase difference amounts in a case where the reliability exceeds the threshold value, the first process is performed in a case where the extracted phase difference amount is the first phase difference amount, and the second process is performed in a case where the extracted phase difference amount is the second phase difference amount. In the second process, the target position of the focus lens is determined based on the extracted second phase difference amount.

The disclosed focusing control method further comprises a target position prediction step of predicting the target position of the focus lens based on a target position history of the focus lens determined in the target position determination step, and a phase difference amount prediction step of converting a difference between the target position predicted in the target position prediction step and a position of the focus lens into a phase difference amount, and predicting the phase difference amount. In the target position determination step, the second process is performed in a case where the reliability exceeds the threshold value. In the second process, a phase difference amount closest to the phase difference amount predicted in the phase difference amount prediction step is extracted from the plurality of second phase difference amounts, and the target position of the focus lens is determined based on the extracted second phase difference amount.

In the disclosed focusing control method, in the second correlation value generation step, the correlation values between the third signal group and the fourth signal group for an arbitrary divided area is acquired by decomposing the correlation values between the first signal group and the second signal group generated in the first correlation value generation step into components of the correlation values for each divided area and storing an integrated value of the decomposed components between the first signal group and the second signal group corresponding to an arbitrary shift amount in the arbitrary divided area, as a correlation value at the arbitrary shift amount in the arbitrary divided area.

Disclosed is a focusing control program causing a computer to perform a first correlation value generation step of acquiring correlation values between a first signal group output from a plurality of first signal detection sections of a focus detection area of a sensor and a second signal group output from a plurality of second signal detection sections of the focus detection area, the plurality of first signal detection sections which receives one of a pair of luminous fluxes passing through different portions arranged in one direction of a pupil region of an imaging optical system including a focus lens and detects signals corresponding to light reception amounts and the plurality of second signal detection sections which receives the other one of the pair of luminous fluxes and detects signals corresponding to light reception amounts being formed in the focus detection area, a second correlation value generation step of performing a process of acquiring correlation values between a third signal group output from the plurality of first signal detection sections included in each of divided areas in a state in which the focus detection area is divided in the one direction and a fourth signal group output from the plurality of second signal detection sections included in the divided area, for each divided area, a first phase difference amount measurement step of measuring a first phase difference amount between the first signal group and the second signal group from the correlation values acquired in the first correlation value generation step, a second phase difference amount measurement step of measuring a second phase difference amount between the third signal group and the fourth signal group for each divided area from the correlation values acquired in the second correlation value generation step, a target position determination step of selectively performing a first process of determining a target position of the focus lens based on the first phase difference amount and a second process of determining the target position of the focus lens based on the second phase difference amount, based on the correlation values acquired in the first correlation value generation step and the correlation values acquired in the second correlation value generation step, and a lens driving control step of driving the focus lens to the target position determined through the first process or the second process.

The invention is applied to, in particular, a television camera for broadcasting or the like, thereby achieving high convenience and effectiveness.

Although the invention has been described above by a specific embodiment, the invention is not limited to the embodiment, and various modifications may be made without departing from the technical spirit of the invention disclosed herein.

This application is based on Japanese Patent Application (2015-194235), filed Sep. 30, 2015, the content of which is incorporated herein.

EXPLANATION OF REFERENCES

40: lens device
1: imaging lens
2: stop
4: lens control unit
5: imaging element
6: analog signal processing unit
7: analog-to-digital conversion circuit
8: lens drive unit
9: stop drive unit
10: imaging element drive unit
11: system control unit
11A: first correlation value generation unit
11B: second correlation value generation unit
11C: first phase difference amount measurement unit
11D: second phase difference amount measurement unit
11E: target position determination unit
11F: lens driving control unit
11G: target position prediction unit
11H: phase difference amount prediction unit
14: operating unit
15: memory control unit
16: main memory
17: digital signal processing unit
18: compression/decompression processing unit
20: external memory control unit
21: recording medium
22: display control unit
23: display unit
24: control bus
25: data bus
50: light reception surface
51: pixel
53: AF area
53s: divided area
52, 52A, 52B: phase difference detection pixel
c: opening
X: row direction
Y: column direction
H1, H2, H3, H4, H5: subject
A1: range
s1: first correlation value
s2: second correlation value
d1, d2: shift amount
Cs, Cm: correlation curve
100: lens device
111: focus lens
112, 113: zoom lens
114: stop
115: master lens group
116: beam splitter
116a: reflection surface
117: mirror
118: condenser lens
119: separator lens
19L, 19R: lens
120: imaging element
121: unit
300: camera device
310: imaging element
320: image processing unit
K: optical axis
200: smartphone
201: housing
202: display panel
203: operation panel 204: display input unit
205: speaker
206: microphone
207: operating unit
208: camera unit
210: wireless communication unit
211: call handling unit
212: storage unit
213: external input/output unit
214: GPS receiving unit
215: motion sensor unit
216: power supply unit
217: internal storage unit
218: external storage unit
220: main control unit
ST1 to STn: GPS satellite

What is claimed is:

1. A focusing control device comprising:
a sensor that has a focus detection area in which a plurality of first signal detection sections which receives one of a pair of luminous fluxes passing through different portions arranged in one direction of a pupil region of an imaging optical system including a focus lens and detects signals corresponding to light reception amounts and a plurality of second signal detection sections which receives other one of the pair of luminous fluxes and detects signals corresponding to light reception amounts are formed; and
at least one hardware processor configured to implement:
a first correlation value generation unit that acquires correlation values between a first signal group output from the plurality of first signal detection sections of the focus detection area and a second signal group output from the plurality of second signal detection sections of the focus detection area;
a second correlation value generation unit that performs a process of acquiring correlation values between a third signal group output from the plurality of first signal detection sections included in each of divided areas in a state in which the focus detection area is divided in the one direction and a fourth signal group output from the plurality of second signal detection sections included in the divided area, for each of the divided areas;
a first phase difference amount measurement unit that measures a first phase difference amount between the first signal group and the second signal group from the correlation values acquired by the first correlation value generation unit;
a second phase difference amount measurement unit that measures a second phase difference amount between the third signal group and the fourth signal group for each of the divided areas from the correlation values acquired by the second correlation value generation unit;
a target position determination unit that selectively performs a first process of determining a target position of the focus lens based on the first phase difference amount and a second process of determining the target position of the focus lens based on the second phase difference amount, based on the correlation values acquired by the first correlation value generation unit and the correlation values acquired by the second correlation value generation unit; and
a lens driving control unit that drives the focus lens to the target position determined through the first process or the second process.

2. The focusing control device according to claim 1,
wherein the target position determination unit determines reliability of the target position determined through the second process based on the correlation values acquired by the first correlation value generation unit and the correlation values acquired by the second correlation value generation unit, performs the first process in a case where the reliability is equal to or less than a threshold value, and performs any one of the first process and the second process in a case where the reliability exceeds the threshold value.

3. The focusing control device according to claim 2,
wherein the target position determination unit measures a first shift amount between the first signal group and the second signal group in a state in which the correlation value between the first signal group and the second signal group is minimum from the correlation values acquired by the first correlation value generation unit, measures a second shift amount between the third signal group and the fourth signal group in a case where a first correlation value which is a minimum value of the correlation values between the third signal group and the fourth signal group calculated in at least a partial range of a range in which a shift amount between the third signal group and the fourth signal group is able to be acquired is acquired from the correlation values acquired by the second correlation value generation unit, and determines that reliability of the target position determined through the second process exceeds the threshold value in a case where the divided area in which a difference between the first shift amount and the second shift amount is equal to or less than a shift amount threshold value is present.

4. The focusing control device according to claim 3,
wherein the target position determination unit determines that the reliability of the target position determined through the second process exceeds the threshold value in a case where the divided area in which a difference between the first correlation values and the second correlation values between the third signal group and the fourth signal group in a case where the shift amount between the third signal group and the fourth signal group is the first shift amount is equal to or greater than a correlation threshold value and the difference between of the first shift amount and the second shift amount exceeds the shift amount threshold value is present.

5. The focusing control device according to claim 3,
wherein the target position determination unit detects the first correlation value by using a partial range of the range in which the shift amount between the third signal group and the fourth signal group is able to be acquired as a target, and
the partial range is a predetermined range including zero as the shift amount between the third signal group and the fourth signal group.

6. The focusing control device according to claim 2,
wherein the target position determination unit calculates a temporary target position of the focus lens based on a minimum phase difference amount of the first phase difference amount and the plurality of second phase difference amounts in a case where the reliability exceeds the threshold value, determines whether or not the target position of the focus lens based on the first phase difference amount falls within a predetermined depth range using the temporary target position in a movement direction of the focus lens as a reference, performs the first process in a case where the target position of the focus lens based on the first phase difference amount falls within the depth range, and performs the second process in a case where the target position of the focus lens based on the first phase difference amount is out of the depth range, and in the second process, the target position of the focus lens is determined based on an average value of the second phase difference amounts measured for the divided areas in which the target position of the focus lens based on the second phase difference amounts falls within the depth range.

7. The focusing control device according to claim 2, wherein the target position determination unit performs the second process in a case where the reliability exceeds the threshold value, and in the second process, a temporary target position of the focus lens is calculated based on a minimum phase difference amount of the plurality of second phase difference amounts, the divided areas in which the target position of the focus lens based on the second phase difference amounts falls within a predetermined depth range using the temporary target position in a movement direction of the focus lens as a reference is specified, and the target position of the focus lens is determined based on an average value of the second phase difference amounts measured for the specified divided areas.

8. The focusing control device according to claim 2, wherein the at least one hardware processor is further configured to implement:

a target position prediction unit that predicts the target position of the focus lens based on a target position history of the focus lens determined by the target position determination unit; and a phase difference amount prediction unit that converts a difference between the target position predicted by the target position prediction unit and a position of the focus lens into a phase difference amount to predict the phase difference amount, wherein the target position determination unit extracts a phase difference amount closest to the phase difference amount predicted by the phase difference amount prediction unit from the first phase difference amount and the plurality of second phase difference amounts in a case where the reliability exceeds the threshold value, calculates a temporary target position of the focus lens based on the extracted phase difference amount, determines whether or not the target position of the focus lens based on the first phase difference amount falls within a predetermined depth range using the temporary target position in a movement direction of the focus lens as a reference, performs the first process in a case where the target position of the focus lens based on the first phase difference amount falls within the depth range, and performs the second process in a case where the target position of the focus lens based on the first phase difference amount is out of the depth range, and in the second process, the target position of the focus lens is determined based on an average value of the second phase difference amounts measured for the divided areas in which the target position of the focus lens based on the second phase difference amounts falls within the depth range.

9. The focusing control device according to claim 2, wherein the at least one hardware processor is further configured to implement:

a target position prediction unit that predicts the target position of the focus lens based on a target position history of the focus lens determined by the target position determination unit; and a phase difference amount prediction unit that converts a difference between the target position predicted by the target position prediction unit and a position of the focus lens into a phase difference amount to predict the phase difference amount, wherein the target position determination unit extracts a phase difference amount closest to the phase difference amount predicted by the phase difference amount prediction unit from the first phase difference amount and the plurality of second phase difference amounts in a case where the reliability exceeds the threshold value, performs the first process in a case where the extracted phase difference amount is the first phase difference amount, and performs the second process in a case where the extracted phase difference amount is the second phase difference amount, and in the second process, the target position of the focus lens is determined based on the extracted second phase difference amount.

10. The focusing control device according to claim 2, wherein the at least one hardware processor is further configured to implement:

a target position prediction unit that predicts the target position of the focus lens based on a target position history of the focus lens determined by the target position determination unit; and a phase difference amount prediction unit that converts a difference between the target position predicted by the target position prediction unit and a position of the focus lens into a phase difference amount to predict the phase difference amount, wherein the target position determination unit performs the second process in a case where the reliability exceeds the threshold value, and in the second process, a phase difference amount closest to the phase difference amount predicted by the phase difference amount prediction unit is extracted from the plurality of second phase difference amounts, and the target position of the focus lens is determined based on the extracted second phase difference amount.

11. The focusing control device according to claim 1, wherein the second correlation value generation unit acquires the correlation values between the third signal group and the fourth signal group for an arbitrary divided area by decomposing the correlation values between the first signal group and the second signal group generated by the first correlation value generation unit into components of the correlation values for each of the divided areas and storing an integrated value of the decomposed components between the first signal group and the second signal group corresponding to an arbitrary shift amount in the arbitrary divided area, as a correlation value at the arbitrary shift amount in the arbitrary divided area.

12. A lens device comprising:

the focusing control device according to claim 1; and an imaging optical system including a focus lens for causing light to be incident on the sensor.

13. An imaging device comprising the focusing control device according to claim 1.

14. A focusing control method comprising:
a first correlation value generation step of acquiring correlation values between a first signal group output from a plurality of first signal detection sections of a focus detection area of a sensor and a second signal group output from a plurality of second signal detection sections of the focus detection area, the plurality of first signal detection sections receiving one of a pair of luminous fluxes passing through different portions arranged in one direction of a pupil region of an imaging optical system including a focus lens and detecting signals corresponding to light reception amounts and the plurality of second signal detection sections receiving other one of the pair of luminous fluxes and detecting signals corresponding to light reception amounts being formed in the focus detection area;
a second correlation value generation step of performing a process of acquiring correlation values between a third signal group output from the plurality of first signal detection sections included in each of divided areas in a state in which the focus detection area is divided in the one direction and a fourth signal group output from the plurality of second signal detection sections included in the divided area, for each of the divided areas;
a first phase difference amount measurement step of measuring a first phase difference amount between the first signal group and the second signal group from the correlation values acquired in the first correlation value generation step;
a second phase difference amount measurement step of measuring a second phase difference amount between the third signal group and the fourth signal group for each of the divided areas from the correlation values acquired in the second correlation value generation step;
a target position determination step of selectively performing a first process of determining a target position of the focus lens based on the first phase difference amount and a second process of determining the target position of the focus lens based on the second phase difference amount, based on the correlation values acquired in the first correlation value generation step and the correlation values acquired in the second correlation value generation step; and
a lens driving control step of driving the focus lens to the target position determined through the first process or the second process,
wherein the first correlation value generation step, the second correlation value generation step, the first phase difference amount measurement step, the second phase difference amount measurement stem the target position determination step, and the lens driving control step are implemented by at least one hardware processor.

15. The focusing control method according to claim 14, wherein, in the target position determination step, reliability of the target position determined through the second process is determined based on the correlation values acquired in the first correlation value generation step and the correlation values acquired in the second correlation value generation step, the first process is performed in a case where the reliability is equal to or less than a threshold value, and any one of the first process and the second process is performed in a case where the reliability exceeds the threshold value.

16. The focusing control method according to claim 15, wherein, in the target position determination step, a first shift amount between the first signal group and the second signal group in a state in which the correlation value between the first signal group and the second signal group is minimum is measured from the correlation values acquired in the first correlation value generation step, a second shift amount between the third signal group and the fourth signal group in a case where a first correlation value which is a minimum value of the correlation values between the third signal group and the fourth signal group calculated in at least a partial range of a range in which a shift amount between the third signal group and the fourth signal group is able to be acquired is acquired is measured from the correlation values acquired in the second correlation value generation step, and reliability of the target position determined through the second process is determined to exceed the threshold value in a case where the divided area in which a difference between the first shift amount and the second shift amount is equal to or less than a shift amount threshold value is present.

17. The focusing control method according to claim 16, wherein, in the target position determination step, the reliability of the target position determined through the second process is determined to exceed the threshold value in a case where the divided area in which a difference between the first correlation values and the second correlation values between the third signal group and the fourth signal group in a case where the shift amount between the third signal group and the fourth signal group is the first shift amount is equal to or greater than a correlation threshold value and the difference between of the first shift amount and the second shift amount exceeds the shift amount threshold value is present.

18. The focusing control method according to claim 16, wherein, in the target position determination step, the first correlation value by using a partial range of the range in which the shift amount between the third signal group and the fourth signal group is able to be acquired is measured as a target, and
the partial range is a predetermined range including zero as the shift amount between the third signal group and the fourth signal group.

19. The focusing control method according to claim 15, wherein, in the target position determination step, a temporary target position of the focus lens is calculated based on a minimum phase difference amount of the first phase difference amount and the plurality of second phase difference amounts in a case where the reliability exceeds the threshold value, whether or not the target position of the focus lens based on the first phase difference amount falls within a predetermined depth range using the temporary target position in a movement direction of the focus lens as a reference is determined, the first process is performed in a case where the target position of the focus lens based on the first phase difference amount falls within the depth range, and the second process is performed in a case where the target position of the focus lens based on the first phase difference amount is out of the depth range, and
in the second process, the target position of the focus lens is determined based on an average value of the second phase difference amounts measured for the divided areas in which the target position of the focus lens based on the second phase difference amounts falls within the depth range in the target position determination step.

20. The focusing control method according to claim 15, wherein, in the target position determination step, the second process is performed in a case where the reliability exceeds the threshold value, and
in the second process, a temporary target position of the focus lens is calculated based on a minimum phase difference amount of the plurality of second phase difference amounts, the divided areas in which the target position of the focus lens based on the second phase difference amounts falls within a predetermined depth range using the temporary target position in a movement direction of the focus lens as a reference are specified, and the target position of the focus lens is determined based on an average value of the second phase difference amounts measured for the specified divided areas.

21. The focusing control method according to claim 15, further comprising:
a target position prediction step of predicting the target position of the focus lens based on a target position history of the focus lens determined in the target position determination step; and
a phase difference amount prediction step of converting a difference between the target position predicted in the target position prediction step and a position of the focus lens into a phase difference amount, and predicting the phase difference amount,
wherein, in the target position determination step, a phase difference amount closest to the phase difference amount predicted in the phase difference amount prediction step is extracted from the first phase difference amount and the plurality of second phase difference amounts in a case where the reliability exceeds the threshold value, a temporary target position of the focus lens is calculated based on the extracted phase difference amount, whether or not the target position of the focus lens based on the first phase difference amount falls within a predetermined depth range using the temporary target position in a movement direction of the focus lens as a reference is determined, the first process is performed in a case where the target position of the focus lens based on the first phase difference amount falls within the depth range, and the second process is performed in a case where the target position of the focus lens based on the first phase difference amount is out of the depth range, and
in the second process, the target position of the focus lens is determined based on an average value of the second phase difference amounts measured for the divided areas in which the target position of the focus lens based on the second phase difference amounts falls within the depth range,
wherein the target position prediction step and the phase difference amount prediction step are implemented by the at least one hardware processor.

22. The focusing control method according to claim 15, further comprising:
a target position prediction step of predicting the target position of the focus lens based on a target position history of the focus lens determined in the target position determination step; and
a phase difference amount prediction step of converting a difference between the target position predicted in the target position prediction step and a position of the focus lens into a phase difference amount, and predicting the phase difference amount,
wherein, in the target position determination step, a phase difference amount closest to the phase difference amount predicted in the phase difference amount prediction step is extracted from the first phase difference amount and the plurality of second phase difference amounts in a case where the reliability exceeds the threshold value, the first process is performed in a case where the extracted phase difference amount is the first phase difference amount, and the second process is performed in a case where the extracted phase difference amount is the second phase difference amount, and
in the second process, the target position of the focus lens is determined based on the extracted second phase difference amount,
wherein the target position prediction step and the phase difference amount prediction step are implemented by the at least one hardware processor.

23. The focusing control method according to claim 15, further comprising:
a target position prediction step of predicting the target position of the focus lens based on a target position history of the focus lens determined in the target position determination step; and
a phase difference amount prediction step of converting a difference between the target position predicted in the target position prediction step and a position of the focus lens into a phase difference amount, and predicting the phase difference amount,
wherein, in the target position determination step, the second process is performed in a case where the reliability exceeds the threshold value, and
in the second process, a phase difference amount closest to the phase difference amount predicted in the phase difference amount prediction step is extracted from the plurality of second phase difference amounts, and the target position of the focus lens is determined based on the extracted second phase difference amount,
wherein the target position prediction step and the phase difference amount prediction step are implemented by the at least one hardware processor.

24. The focusing control method according to claim 14, wherein, in the second correlation value generation step, the correlation values between the third signal group and the fourth signal group for an arbitrary divided area is acquired by decomposing the correlation values between the first signal group and the second signal group generated in the first correlation value generation step into components of the correlation values for each of the divided areas and storing an integrated value of the decomposed components between the first signal group and the second signal group corresponding to an arbitrary shift amount in the arbitrary divided area, as a correlation value at the arbitrary shift amount in the arbitrary divided area.

25. A non-transitory computer readable medium storing a focusing control program causing a computer to perform:
a first correlation value generation step of acquiring correlation values between a first signal group output from a plurality of first signal detection sections of a focus detection area of a sensor and a second signal group output from a plurality of second signal detection sections of the focus detection area, the plurality of first signal detection sections receiving one of a pair of luminous fluxes passing through different portions arranged in one direction of a pupil region of an imaging optical system including a focus lens and detecting signals corresponding to light reception amounts and the plurality of second signal detection sections receiving other one of the pair of luminous fluxes and detecting signals corresponding to light reception amounts being formed in the focus detection area;

a second correlation value generation step of performing a process of acquiring correlation values between a third signal group output from the plurality of first signal detection sections included in each of divided areas in a state in which the focus detection area is divided in the one direction and a fourth signal group output from the plurality of second signal detection sections included in the divided area, for each of the divided areas;

a first phase difference amount measurement step of measuring a first phase difference amount between the first signal group and the second signal group from the correlation values acquired in the first correlation value generation step;

a second phase difference amount measurement step of measuring a second phase difference amount between the third signal group and the fourth signal group for each of the divided areas from the correlation values acquired in the second correlation value generation step;

a target position determination step of selectively performing a first process of determining a target position of the focus lens based on the first phase difference amount and a second process of determining the target position of the focus lens based on the second phase difference amount, based on the correlation values acquired in the first correlation value generation step and the correlation values acquired in the second correlation value generation step; and a lens driving control step of driving the focus lens to the target position determined through the first process or the second process, wherein the first correlation value generation step, the second correlation value generation step, the first phase difference amount measurement step, the second phase difference amount measurement step, the target position determination step, and the lens driving control step are implemented by at least one hardware processor.

* * * * *